US009484152B2

(12) United States Patent
Yoshida

(10) Patent No.: US 9,484,152 B2
(45) Date of Patent: Nov. 1, 2016

(54) ELECTRONIC COMPONENT, SUBSTRATE-TYPE TERMINAL INCLUDED THEREIN, AND ELECTRONIC COMPONENT MOUNTED STRUCTURE

(71) Applicant: Murata Manufacturing Co., Ltd., Nagaokakyo-shi, Kyoto-fu (JP)

(72) Inventor: Hiroyasu Yoshida, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 315 days.

(21) Appl. No.: 14/198,616

(22) Filed: Mar. 6, 2014

(65) Prior Publication Data
US 2014/0268487 A1    Sep. 18, 2014

(30) Foreign Application Priority Data

Mar. 15, 2013 (JP) .................................. 2013-053366

(51) Int. Cl.
*H01G 4/228* (2006.01)
*H01G 4/30* (2006.01)
*H01G 2/06* (2006.01)

(52) U.S. Cl.
CPC .............. *H01G 2/065* (2013.01); *H01G 4/228* (2013.01); *H01G 4/308* (2013.01)

(58) Field of Classification Search
USPC ............ 361/306.1, 306.3, 308.1, 301.4, 749; 174/254–255
See application file for complete search history.

(56) References Cited

U.S. PATENT DOCUMENTS

| 7,331,799 B1* | 2/2008 | Lee | H01G 2/06 361/306.3 |
|---|---|---|---|
| 2004/0066589 A1 | 4/2004 | Togashi et al. | |
| 2013/0033836 A1 | 2/2013 | Hattori et al. | |
| 2013/0037911 A1 | 2/2013 | Hattori et al. | |
| 2014/0016242 A1 | 1/2014 | Hattori et al. | |
| 2014/0268487 A1* | 9/2014 | Yoshida | H01G 2/065 361/301.4 |

FOREIGN PATENT DOCUMENTS

| JP | 07-212004 | 8/1995 |
|---|---|---|
| JP | 2004-134430 | 4/2004 |
| JP | 2012-204572 | 10/2012 |
| JP | 2012-212943 | 11/2012 |
| JP | 2012-212944 | 11/2012 |
| JP | 2013-038144 | 2/2013 |
| JP | 2013-038291 | 2/2013 |
| WO | 2012/090986 | 7/2012 |
| WO | 2013/008549 | 1/2013 |
| WO | 2013/008550 | 1/2013 |

* cited by examiner

*Primary Examiner* — Eric Thomas
(74) *Attorney, Agent, or Firm* — Keating & Bennett, LLP

(57) ABSTRACT

A substrate-type terminal includes a first major surface with a first mounting electrode and a second mounting electrode. The substrate-type terminal includes a second major surface with a first connecting electrode and a second connecting electrode. The substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface.

24 Claims, 14 Drawing Sheets

ELECTRONIC COMPONENT, SUBSTRATE-TYPE TERMINAL INCLUDED THEREIN, AND ELECTRONIC COMPONENT MOUNTED STRUCTURE

BACKGROUND OF THE INVENTION

1. Field of the Invention

The present invention generally relates to an electronic component, a substrate-type terminal included therein, and an electronic component mounted structure, and particularly to an electronic component to which alternating current (ac) voltage is applied, a substrate-type terminal included therein, and an electronic component mounted structure.

2. Description of the Related Art

In recent years, electronic devices are rapidly enhanced in performance, and accordingly, multilayer ceramic capacitors are increased in capacitance. A large capacitance multilayer ceramic capacitor includes a dielectric formed of material including barium titanate or similar, high dielectric constant ceramics.

These high dielectric constant ceramics have piezoelectricity and electrostrictivity. As such, when voltage is applied to the multilayer ceramic capacitor including a dielectric formed of a high dielectric constant ceramic, the multilayer ceramic capacitor is mechanically strained.

As such, when ac voltage or direct current (dc) voltage with an ac component superimposed thereon is applied to these multilayer ceramic capacitors, they are mechanically strained and accordingly oscillate. This oscillation propagates to an external circuit board having the multilayer ceramic capacitor connected thereto.

When the propagated oscillation causes the external circuit board to oscillate in an audio frequency range of 20 Hz to 20 kHz, the external circuit board causes an audible sound generally referred to as "acoustic noise".

Electronic components having structures to reduce this acoustic noise are disclosed in prior art documents including Japanese Patent Laying-Open No. 2004-134430 and WO 2012/090986.

Japanese Patent Laying-Open No. 2004-134430 describes an electronic component with a multilayer capacitor having a body, or a capacitor element, overlying a single interposer board. The interposer board has a front surface with a pair of mounting electrodes disposed thereon and connected to a pair of external electrodes, respectively, of the capacitor element. The interposer board has a back surface with a pair of connecting electrodes disposed thereon and soldered to line patterns, respectively, of a substrate.

The pair of mounting electrodes and the pair of connecting electrodes are disposed on the interposer board such that the pairs are connected by virtual straight lines extending in perpendicular or substantially perpendicular directions, respectively.

WO 2012/090986 describes an electronic component with an interposer including an insulating substrate having one major surface to mount a multilayer ceramic capacitor thereon, the major surface having mounting electrodes. The insulating substrate, as observed in a direction perpendicular or substantially perpendicular to the major surface, is generally identical in geometry to the multilayer ceramic capacitor to be mounted. The multilayer ceramic capacitor is mounted on the insulating substrate such that they have their respective longitudinal directions generally matching each other.

The insulating substrate, as observed in the direction perpendicular or substantially perpendicular to the major surface, has four corners each having a notch with a side via electrode. By these side via electrodes, the mounting electrodes on one major surface are electrically connected to connecting electrodes, respectively, provided on the other major surface for connection to an external circuit board.

The electronic components described in Japanese Patent Laying-Open No. 2004-134430 and WO 2012/090986 have room for further reducing the audible sound generated by oscillation propagated from the multilayer ceramic capacitor to the external circuit board via the interposer.

SUMMARY OF THE INVENTION

Preferred embodiments of the present invention provide an electronic component capable of reducing audible sound otherwise generated, a substrate-type terminal included therein, and an electronic component mounted structure.

According to a preferred embodiment of the present invention, an electronic component includes a capacitor element including a stack of layers in a form of a rectangular or substantially rectangular parallelepiped including a dielectric layer and an internal electrode stacked alternately in layers, a first external electrode provided at one longitudinally end portion of the stack of layers, and a second external electrode provided at the other longitudinally end portion of the stack of layers; and a substrate-type terminal including a first major surface and a second major surface opposite to the first major surface, and including the capacitor element mounted on the first major surface. The substrate-type terminal includes on the first major surface a first mounting electrode electrically connected to the first external electrode of the capacitor element and a second mounting electrode electrically connected to the second external electrode of the capacitor element. The substrate-type terminal includes on the second major surface a first connecting electrode provided for external connection and electrically connected to the first mounting electrode and a second connecting electrode provided for external connection and electrically connected to the second mounting electrode. The substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface.

In one preferred embodiment of the present invention, the first slit and the second slit each include one end reaching an edge of the substrate-type terminal and thus opened as seen in a plane.

In one preferred embodiment of the present invention, the capacitor element is mounted with the dielectric layer and the internal electrode stacked in layers in a direction parallel or substantially parallel to the first major surface of the substrate-type terminal.

In one preferred embodiment of the present invention, the capacitor element is mounted with the dielectric layer and the internal electrode stacked in layers in a direction perpendicular or substantially perpendicular to the first major surface of the substrate-type terminal.

In one preferred embodiment of the present invention, the substrate-type terminal includes two first slits spaced from and opposite to each other and two second slits spaced from and opposite to each other. The first connecting electrode is located between the first slits, as seen in a plane. The second connecting electrode is located between the second slits, as seen in a plane.

In one preferred embodiment of the present invention, the substrate-type terminal includes two first slits spaced from and opposite to each other and two second slits spaced from and opposite to each other. The first mounting electrode is located between the first slits, as seen in a plane. The second mounting electrode is located between the second slits, as seen in a plane.

In one preferred embodiment of the present invention, the first and second slits are closed by a resist provided on one of the first major surface and the second major surface.

In one preferred embodiment of the present invention, the substrate-type terminal, as seen in a plane, includes an edge with a notch. The first and second slits each include one end reaching the notch and thus being open, as seen in a plane.

According to another preferred embodiment of the present invention, a substrate-type terminal includes, mounted thereon, a capacitor element including a stack of layers in a form of a rectangular or substantially rectangular parallelepiped including a dielectric layer and an internal electrode stacked alternately in layers, a first external electrode provided at one longitudinally end portion of the stack of layers, and a second external electrode provided at the other longitudinally end portion of the stack of layers. The substrate-type terminal includes a first major surface to mount the capacitor element thereon, and a second major surface opposite to the first major surface. The substrate-type terminal includes on the first major surface a first mounting electrode electrically connected to the first external electrode of the capacitor element and a second mounting electrode electrically connected to the second external electrode of the capacitor element. The substrate-type terminal includes on the second major surface a first connecting electrode provided for external connection and electrically connected to the first mounting electrode and a second connecting electrode provided for external connection and electrically connected to the second mounting electrode. The substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface.

According to another preferred embodiment of the present invention, an electronic component mounted structure includes a capacitor element including a stack of layers in a form of a rectangular or substantially rectangular parallelepiped including a dielectric layer and an internal electrode stacked alternately in layers, a first external electrode provided at one longitudinally end portion of the stack of layers, and a second external electrode provided at the other longitudinally end portion of the stack of layers; a substrate-type terminal including a first major surface and a second major surface opposite to the first major surface, and including the capacitor element mounted on the first major surface; and an external circuit board including a surface with a first land and a second land and having the substrate-type terminal connected thereto. The substrate-type terminal includes on the first major surface a first mounting electrode electrically connected to the first external electrode of the capacitor element and a second mounting electrode electrically connected to the second external electrode of the capacitor element. The substrate-type terminal includes on the second major surface a first connecting electrode electrically connected to the first mounting electrode and the first land and a second connecting electrode electrically connected to the second mounting electrode and the second land. The substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface.

Various preferred embodiments of the present invention thus achieve significantly reduced audible sound.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter reference will be made to the drawings to describe an electronic component, a substrate-type terminal included therein, and an electronic component mounted structure according to a first preferred embodiment of the present invention. In describing the following preferred embodiments, components shown in the figures identically or similarly are identically denoted and will not be described repeatedly.

First Preferred Embodiment

A capacitor element included in an electronic component according to the first preferred embodiment of the present invention will be described initially.

Figure 1:
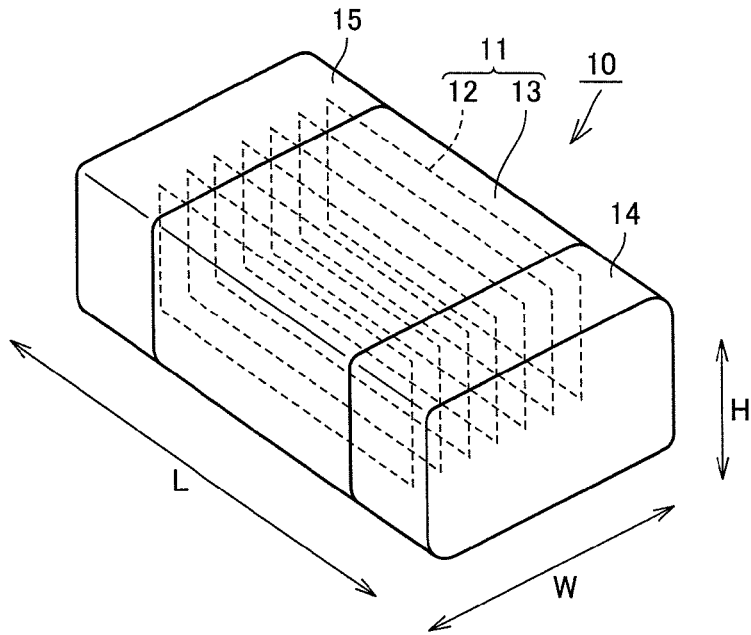
FIG. 1 is a perspective view of a first structure of a capacitor element included in an electronic component according to a first preferred embodiment of the present invention.
Figure 2:
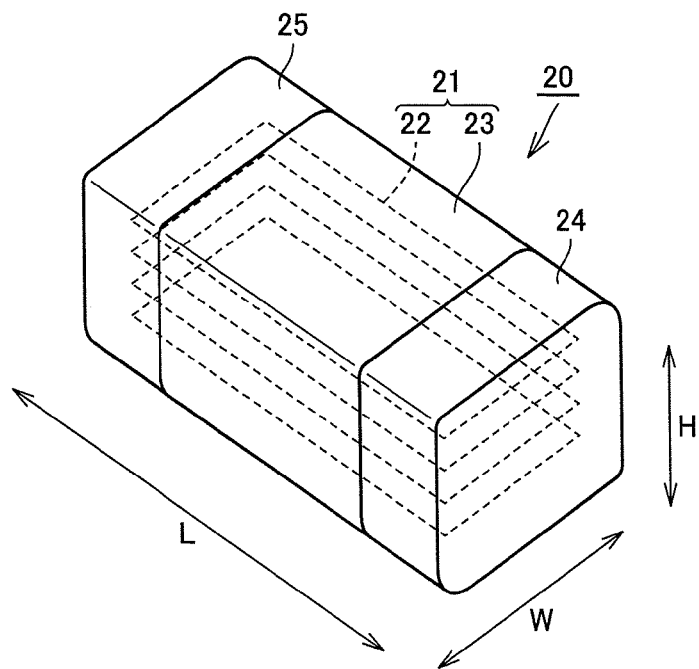
FIG. 2 is a perspective view of a second structure of the capacitor element included in the electronic component according to the first preferred embodiment of the present invention.

FIG. 1 is a perspective view of a first structure of the capacitor element included in the electronic component according to the first preferred embodiment of the present invention. FIG. 2 is a perspective view of a second structure of the capacitor element included in the electronic component according to the first preferred embodiment of the present invention.

FIGS. 1 and 2 show stacks of layers, which will be described hereinafter, having a longitudinal direction represented by L, a widthwise direction represented by W, and a depthwise direction represented by H.

As shown in FIG. 1, the first preferred embodiment of the present invention provides an electronic component including a capacitor element 10 having a first structure including a stack of layers 11 in the form of a rectangular or substantially rectangular parallelepiped having a dielectric layer 13 and an internal electrode 12 in the form of a plate stacked alternately in layers, a first external electrode 14 provided at one longitudinally end portion of stack of layers 11, and a second external electrode 15 provided at the other longitudinally end portion of stack of layers 11.

Immediately adjacent, opposite internal electrodes 12 include first and second internal electrodes 12 electrically connected to first 14 and second 15 external electrodes, respectively.

Capacitor element 10 of the first structure includes dielectric layer 13 and internal electrode 12 stacked in layers in a direction perpendicular or substantially perpendicular to longitudinal and depthwise directions L and H of stack of layers 11. In other words, dielectric layer 13 and internal electrode 12 are stacked in layers in a direction parallel or substantially parallel to widthwise direction W of stack of layers 11.

As shown in FIG. 2, the first preferred embodiment of the present invention provides an electronic component including a capacitor element 20 having a second structure including a stack of layers 21 in the form of a rectangular or substantially rectangular parallelepiped including a dielectric layer 23 and an internal electrode 22 in the form of a plate stacked alternately in layers, a first external electrode 24 provided at one longitudinally end portion of stack of layers 21, and a second external electrode 25 provided at the other longitudinally end portion of stack of layers 21.

Immediately adjacent, opposite internal electrodes 22 include first and second internal electrodes 22 electrically connected to first 24 and second 25 external electrodes, respectively.

Capacitor element 20 of the second structure includes dielectric layer 23 and internal electrode 22 stacked in layers in a direction perpendicular or substantially perpendicular to longitudinal and widthwise directions L and W of stack of layers 21. In other words, dielectric layer 23 and internal electrode 22 are stacked in layers in a direction parallel or substantially parallel to depthwise direction H of stack of layers 21.

In the present preferred embodiment, dielectric layers 13 and 23 preferably are configured of a ceramic sheet containing barium titanate or the like as a major component. Note, however, that dielectric layers 13 and 23 may not be configured with barium titanate as a major material, and high dielectric constant ceramics suffice. Furthermore, dielectric layers 13 and 23 may be configured with the major material of ceramics replaced with polypropylene, polyethylene or similar resin film.

Internal electrodes 12 and 22 are preferably formed by printing a Ni containing-paste on the ceramic sheet configuring dielectric layers 13 and 23. Note, however, that internal electrodes 12 and 22 may not be formed with Ni as a major material; internal electrodes 12 and 22 may be formed with an alloy of Pd and Ag or the like as a major material.

First external electrodes 14 and 24 and second external electrodes 15 and 25 are preferably formed by baking an electrically conductive paste on stacks of layers 11 and 21 or plating stacks of layers 11 and 21. First external electrodes 14 and 24 and second external electrodes 15 and 25 preferably have a multilayer structure formed of Ni, Sn and/or similar metallic films sequentially stacked in layers.

Preferably, capacitor elements 10 and 20 geometrically have a length and a width of, for example, approximately 3.2 mm×1.6 mm, 2.0 mm×1.25 mm, 1.6 mm×0.8 mm, 1.0 mm×0.5 mm, 0.8 mm×0.4 mm, or 0.6 mm×0.3 mm.

When ac voltage or dc voltage with an ac component superimposed thereon is applied to capacitor elements 10 and 20, the capacitor elements are mechanically strained.

Figure 3:
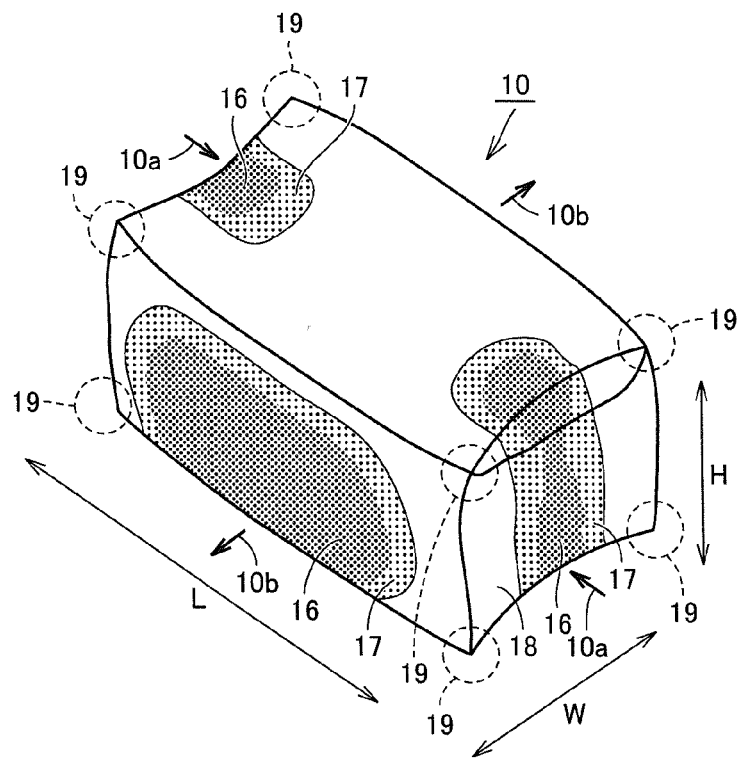
FIG. 3 is a perspective view showing a result of a simulation of how the capacitor element of the first structure is strained.
Figure 4:
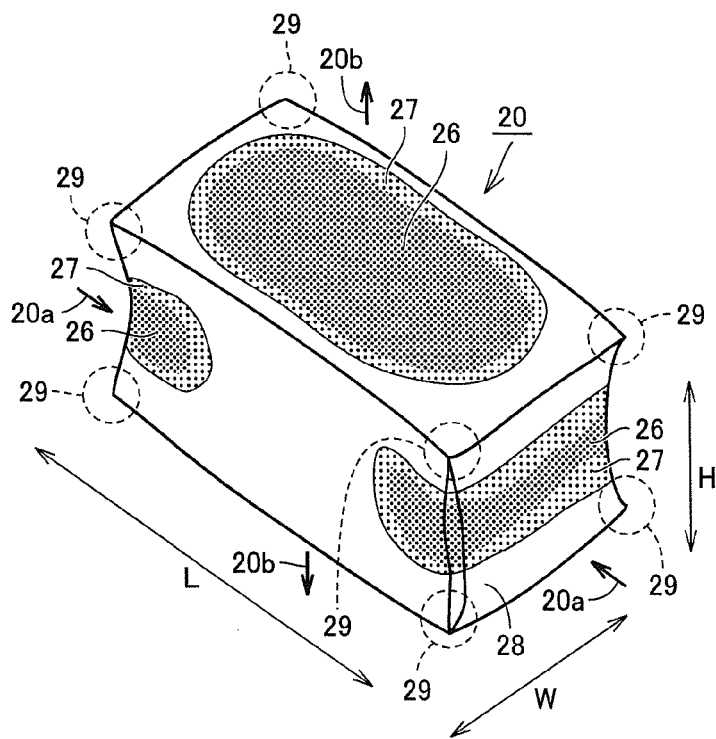
FIG. 4 is a perspective view showing a result of a simulation of how the capacitor element of the second structure is strained.

FIG. 3 is a perspective view showing a result of a simulation of how the capacitor element of the first structure is strained. FIG. 4 is a perspective view showing a result of a simulation of how the capacitor element of the second structure is strained.

FIG. 3 shows a significantly strained region 16, a moderately strained region 17, and a less strained region 18 for a total of three levels in strain. FIG. 4 shows a significantly strained region 26, a moderately strained region 27, and a less strained region 28 for a total of three levels in strain.

As shown in FIG. 3, capacitor element 10 of the first structure includes an end surface perpendicular or substantially perpendicular to longitudinal direction L with a center portion, as seen in widthwise direction W, strained inwards along depthwise direction H, as indicated by an arrow 10a. On the other hand, the capacitor element includes a lateral surface perpendicular or substantially perpendicular to widthwise direction W with an inward portion strained outwards, as indicated by an arrow 10b. The capacitor element has each corner 19 substantially unstrained.

As shown in FIG. 4, capacitor element 20 of the second structure includes an end surface perpendicular or substantially perpendicular to longitudinal direction L with a center portion, as seen in depthwise direction H, strained inwards along widthwise direction W, as indicated by an arrow 20a. On the other hand, the capacitor element includes a major surface perpendicular or substantially perpendicular to depthwise direction H with an inward portion strained outwards, as indicated by an arrow 20b. The capacitor element has each corner 29 substantially unstrained.

Capacitor elements 10 and 20 strained, as described above, repeatedly in accordance with the ac voltage's cycle act as a source of oscillation. To significantly reduce or prevent propagation of the oscillation, the present preferred embodiment provides an electronic component including a substrate-type terminal 30, as will be described hereinafter.

Figure 5:
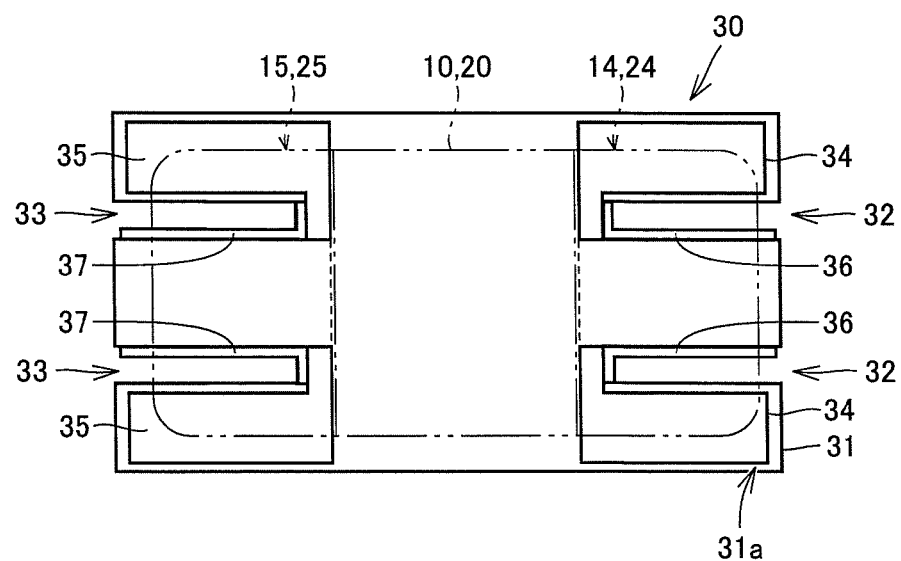
FIG. 5 is a view of a substrate-type terminal included in the electronic component according to the first preferred embodiment of the present invention, as seen at a first major surface.
Figure 6:
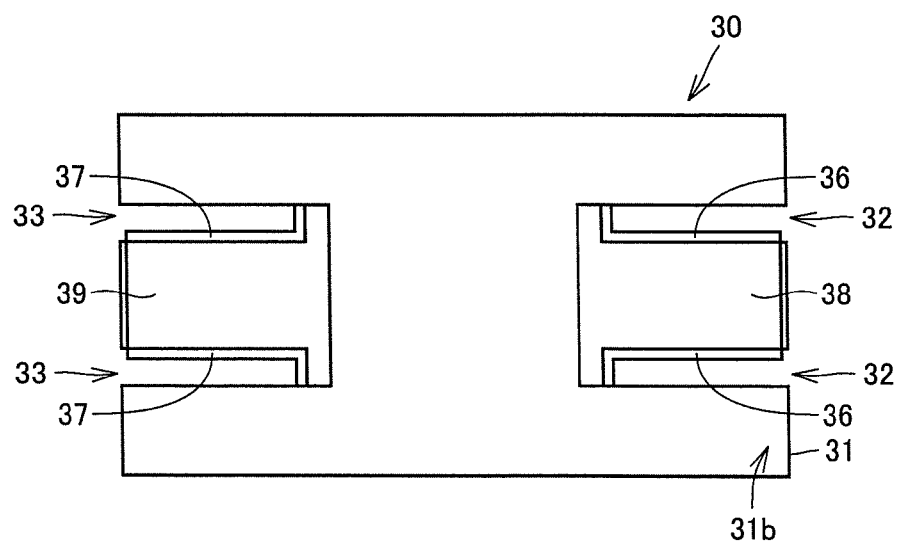
FIG. 6 is a view of the substrate-type terminal included in the electronic component according to the first preferred embodiment of the present invention, as seen at a second major surface.

FIG. 5 is a view of a substrate-type terminal included in the electronic component according to the present preferred embodiment, as seen at a first major surface. FIG. 6 is a view of the substrate-type terminal included in the electronic component according to the present preferred embodiment, as seen at a second major surface.

As shown in FIG. 5 and FIG. 6, the electronic component of the present preferred embodiment includes substrate-type terminal 30 including an insulating substrate 31. Insulating substrate 31 preferably is rectangular or substantially rectangular.

Insulating substrate 31 includes a first major surface 31a to mount capacitor element 10, 20 thereon, and a second major surface 31b opposite to first major surface 31a, as will be described hereinafter.

Insulating substrate 31 can be formed of epoxy resin or a similar resin material, or alumina or a similar ceramic material, for example. Furthermore, insulating substrate 31 may have an inorganic or organic filler or woven fabric added thereto. The present preferred embodiment provides insulating substrate 31 preferably in the form of a glass epoxy substrate having a matrix of epoxy resin with glassy woven fabric added thereto.

As will be described hereinafter, in view of significantly reducing or preventing propagation of oscillation, insulating substrate 31 preferably has a thickness equal to or smaller than about 0.2 mm, more preferably equal to or smaller than about 0.1 mm, for example.

In view of reliably mounting capacitor elements 10 and 20, insulating substrate 31 preferably has a length of about 0.8 times or larger, more preferably about 0.9 times or larger than capacitor elements 10 and 20. Insulating substrate 31 preferably has a width of about 0.8 times or larger, more preferably about 0.9 times or larger than capacitor elements 10 and 20.

In view of reducing capacitor elements 10 and 20 in footprint, insulating substrate 31 preferably has a length about 2.0 times or smaller, more preferably about 1.5 times or smaller than capacitor elements 10 and 20. Insulating substrate 31 preferably has a width about 2.0 times or smaller, more preferably about 1.5 times or smaller than capacitor elements 10 and 20.

As shown in FIG. 5, substrate-type terminal 30 includes first major surface 31a with a first mounting electrode 34 electrically connected to first external electrodes 14 and 24 of capacitor elements 10 and 20 and a second mounting electrode 35 electrically connected to second external electrodes 15 and 25 of capacitor elements 10 and 20.

In other words, insulating substrate 31 includes first mounting electrode 34 on first major surface 31a at one longitudinally end portion of insulating substrate 31 and second mounting electrode 35 on first major surface 31a at the other longitudinally end portion of insulating substrate 31.

As shown in FIG. 6, substrate-type terminal 30 includes second major surface 31b with a first connecting electrode 38 provided for external connection and electrically connected to first mounting electrode 34 and a second connecting electrode 39 provided for external connection and electrically connected to second mounting electrode 35.

In other words, insulating substrate 31 includes first connecting electrode 38 on second major surface 31b at one longitudinally end portion of insulating substrate 31 and second connecting electrode 39 on second major surface 31b at the other longitudinally end portion of insulating substrate 31.

First mounting electrode 34 and first connecting electrode 38 are electrically connected by a first connecting conductor 36 provided on an internal surface of a first slit 32, which will be described hereinafter, provided in insulating substrate 31.

Second mounting electrode 35 and second connecting electrode 39 are electrically connected by a second connecting conductor 37 provided on an internal surface of a second slit 33, which will be described hereinafter, provided in insulating substrate 31.

Substrate-type terminal 30 includes first slit 32 located between first mounting electrode 34 and first connecting electrode 38, as seen in a plane, and penetrating the terminal from first major surface 31a to second major surface 31b, and second slit 33 located between second mounting electrode 35 and second connecting electrode 39, as seen in a plane, and penetrating the terminal from first major surface 31a to second major surface 31b. When the electronic component is seen in a plane, first slit 32 and second slit 33 at least partially overlap capacitor elements 10 and 20.

Note that the slit preferably includes a linear cut and an elongate gap. Other preferred embodiments also preferably include the slit arranged in a similar manner.

First slit 32 and second slit 33 are preferably formed using a drill, a dicer or the like. First slit 32 and second slit 33 extend in a longitudinal direction of substrate-type terminal 30.

In the present preferred embodiment, substrate-type terminal 30 includes two first slits 32 spaced from and opposite to each other, and two second slits 33 spaced from and opposite to each other.

Thus, first connecting electrode 38 is located between first slits 32, as seen in a plane. Second connecting electrode 39 is located between second slits 33, as seen in a plane.

Note that at least one first slit 32 suffices and so does second slit 33.

Furthermore, in the present preferred embodiment, first slit 32 and second slit 33 each include one end reaching an edge of insulating substrate 31 and thus opened as seen in a plane. Note that first slit 32 and second slit 33 are not limited in geometry to the above, and may not have an opening that reaches the edge of insulating substrate 31.

Hereinafter will be described an electronic component mounted structure 100 including an electronic component that includes capacitor element 10, 20 and substrate-type terminal 30 connected to an external circuit board.

Figure 7:
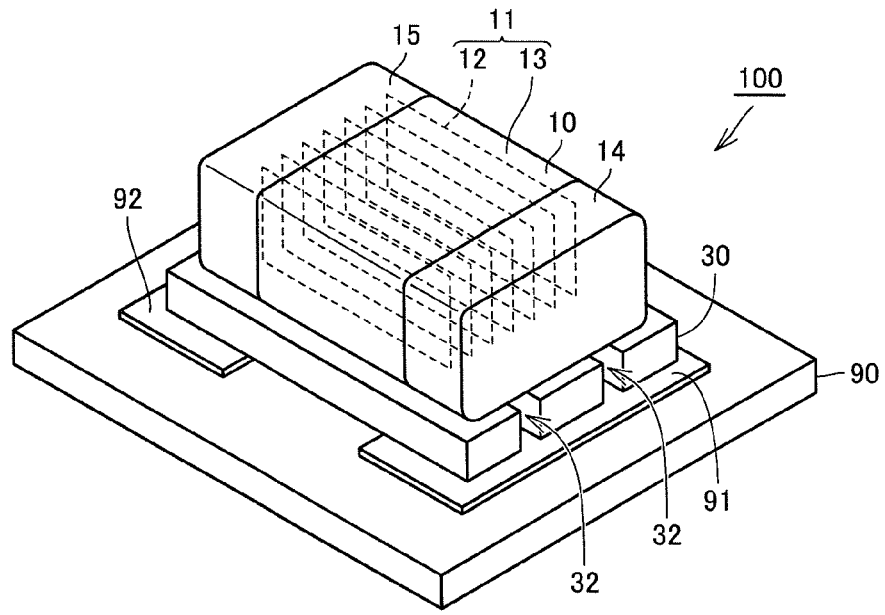
FIG. 7 is a perspective view of an electronic component mounted structure according to the first preferred embodiment of the present invention.
Figure 8:
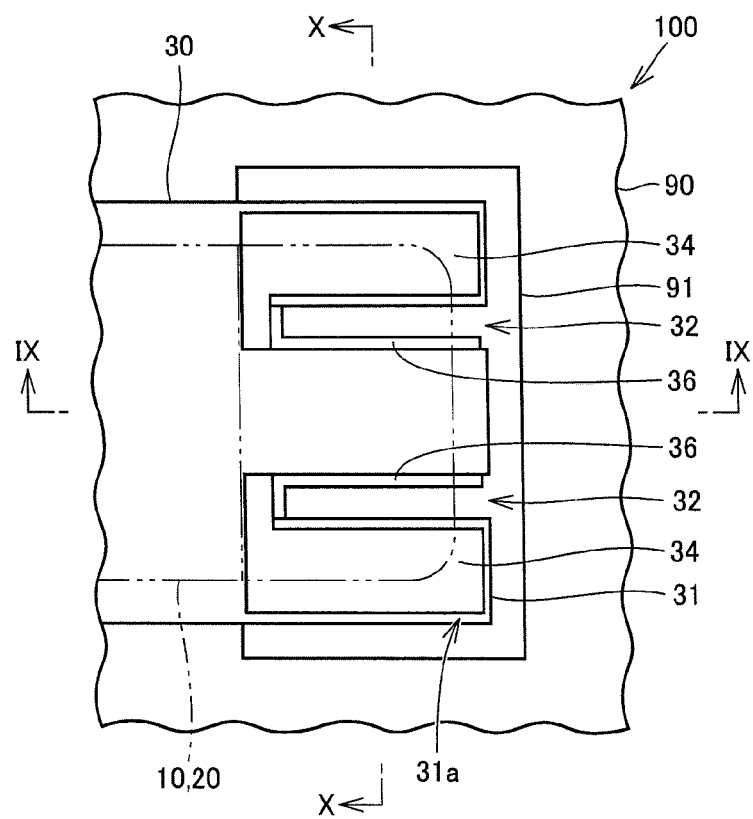
FIG. 8 is a plan view of the FIG. 7 electronic component mounted structure at one longitudinally end portion of the electronic component, as seen in a planar arrangement.
Figure 9:
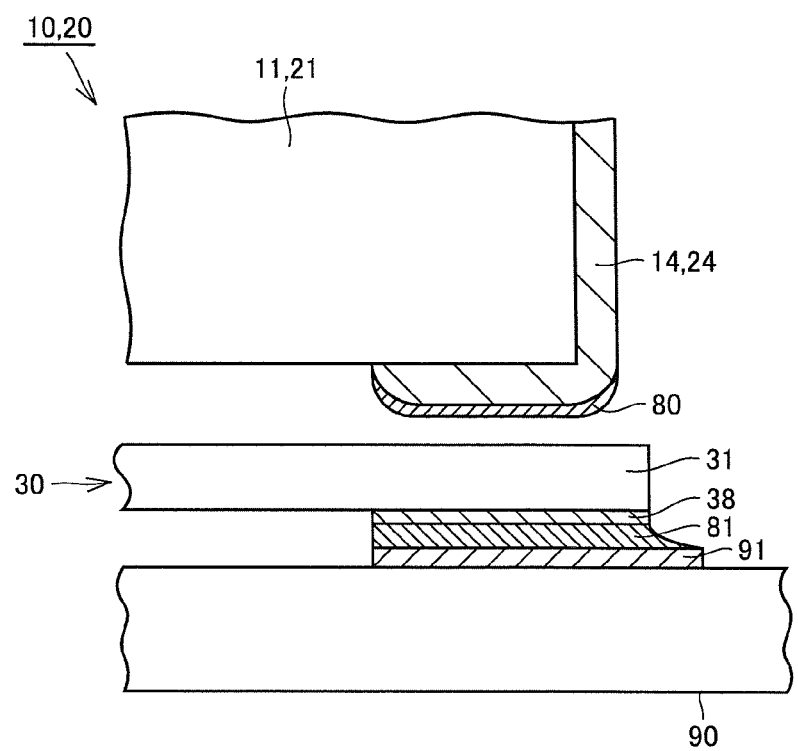
FIG. 9 is a partial cross section of the FIG. 8 electronic component mounted structure as seen in a direction indicated by an arrow IX-IX.
Figure 10:
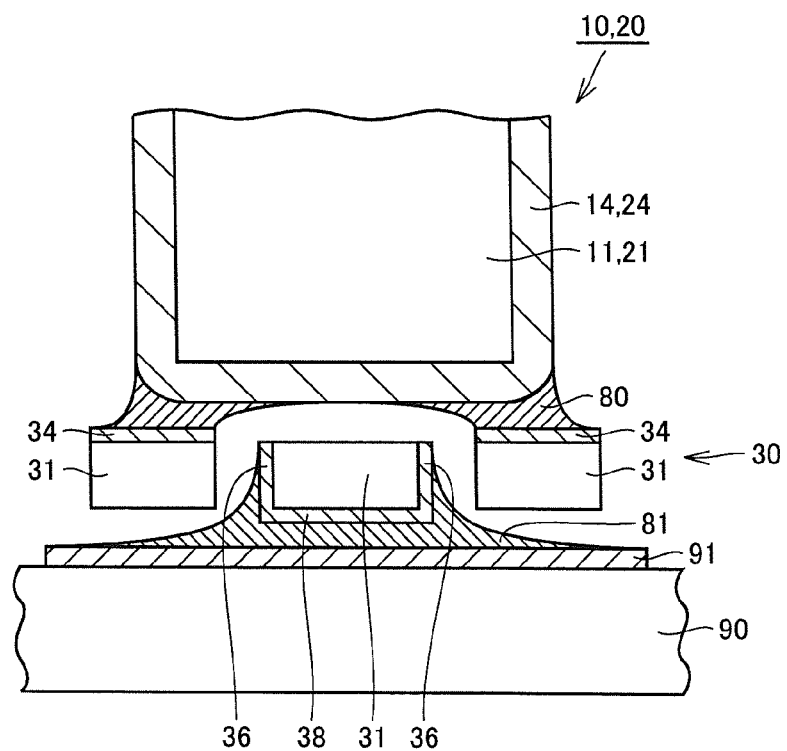
FIG. 10 is a partial cross section of the FIG. 8 electronic component mounted structure as seen in a direction indicated by an arrow X-X.

FIG. 7 is a perspective view of an electronic component mounted structure according to the present preferred embodiment. FIG. 8 is a plan view of the FIG. 7 electronic component mounted structure at one longitudinally end portion of the electronic component, as seen in a planar arrangement. FIG. 9 is a partial cross section of the FIG. 8 electronic component mounted structure as seen in a direction indicated by an arrow IX-IX. FIG. 10 is a partial cross section of the FIG. 8 electronic component mounted structure as seen in a direction indicated by an arrow X-X.

Note that FIG. 7 is a view for capacitor element 10 of the first structure. Furthermore, FIG. 8 shows in perspective capacitor elements 10 and 20.

As shown in FIG. 7 to FIG. 10, the present preferred embodiment provides electronic component mounted structure 100 including capacitor element 10, 20, substrate-type terminal 30, and an external circuit board 90.

External circuit board 90 has on a surface thereof a first land 91 connected to first connecting electrode 38 of substrate-type terminal 30 and a second land 92 connected to second connecting electrode 39 of substrate-type terminal 30.

First land 91 has a size to cover first connecting electrode 38 of substrate-type terminal 30, as seen in a plane. Second land 92 has a size to cover second connecting electrode 39 of substrate-type terminal 30, as seen in a plane.

While hereinafter the mounted structure will be described for the first external electrode of the capacitor element, the mounted structure is similarly described for the second external electrode of the capacitor element.

Capacitor element 10, 20 and substrate-type terminal 30 include first external electrode 14, 24 and first mounting electrode 34, respectively, electrically connected via solder 80 serving as a bonding agent. Solder 80 is provided by reflowing. Note that the bonding agent is not limited to solder and may be any material that can mechanically and electrically bond first external electrode 14, 24 and first mounting electrode 34 together.

Substrate-type terminal 30 and external circuit board 90 have first connecting electrode 38 and first land 91, respectively, electrically connected by solder 81 serving as a bonding agent. Solder 81 is provided by reflowing. Note that the bonding agent is not limited to solder and may be any material that can mechanically and electrically bond first connecting electrode 38 and first land 91 together.

The above mounted structure allows capacitor elements 10 and 20 and external circuit board 90 to be mechanically and electrically interconnected via substrate-type terminal 30.

Specifically, first external electrode 14, 24, solder 80, first mounting electrode 34, first connecting conductor 36, first connecting electrode 38, solder 81, and first land 91 are electrically connected in this order to electrically connect capacitor element 10, 20 and external circuit board 90.

In electronic component mounted structure 100 when ac voltage or dc voltage with an ac component superimposed thereon is applied to capacitor element 10, 20 and the capacitor element oscillates, the oscillation propagates via solder 80 to first mounting electrode 34 of substrate-type terminal 30.

The oscillation propagated to first mounting electrode 34 is further propagated via insulating substrate 31 from first major surface 31a to second major surface 31b while traveling around and thus detouring first slit 32 and thus reaches first connecting electrode 38.

The oscillation thus travels an increased distance to propagate from first mounting electrode 34 to first connecting electrode 38. Furthermore, first slit 32 reduces insulating substrate 31 in rigidity and thus enables the insulating substrate 31 to absorb the oscillation. In the present preferred embodiment, in particular, first slit 32 includes one end open and thus allows the oscillation to be absorbed significantly effectively.

Thus, when the oscillation propagates through insulating substrate 31, the oscillation is damped and thus propagated to first connecting electrode 38 in a reduced amount. Accordingly, first connecting electrode 38 propagates reduced oscillation via solder 81 to first land 91. This results in reduced oscillation propagated to external circuit board 90, and hence reduced audible sound.

Note that when the oscillation propagated to first mounting electrode 34 is further propagated through insulating substrate 31 from first major surface 31a to second major surface 31b while traveling around and thus detouring first slit 32 and thus reaches first connecting electrode 38, it is damped in an amount, which is larger when the oscillation travels around first slit 32 via a detour smaller in rigidity. In other words, a detour smaller in rigidity contributes to limited propagation of oscillation, and hence reduced acoustic noise.

Accordingly, in view of reducing the detour in rigidity, it is preferable that insulating substrate 31 be smaller in thickness. Specifically, insulating substrate 31 is preferably about 0.2 mm or smaller, more preferably about 0.1 mm or smaller in thickness, for example.

It should be noted, however, that when insulating substrate 31 is excessively small in thickness, solder 81 may creep up and thus reach capacitor element 10, 20 and thus form a fillet on an end surface of capacitor element 10, 20.

This is not preferable as the oscillation propagates from capacitor element 10, 20 to external circuit board 90 via the fillet of solder 81.

To prevent solder 81 from creeping up, it is preferable that insulating substrate 31 be about 0.05 mm or larger in thickness, for example.

Note that in the present preferred embodiment, as shown in FIG. 7, capacitor elements 10 and 20 preferably have their corners connected to first and second mounting electrodes 34 and 35. As shown in FIG. 3 and FIG. 4, capacitor elements 10 and 20 have corners 19 and 29, respectively, less strained, and connecting capacitor elements 10 and 20 at their corners to first and second mounting electrodes 34 and 35 effectively reduces or prevents the oscillation of capacitor elements 10 and 20 that would otherwise be propagated to first and second mounting electrodes 34 and 35.

For capacitor element 20 of the second structure, if solder 80 should form a fillet having a large height, the fillet adheres to capacitor element 20 on an end surface at more strained regions 26 and 27. This is not preferable as it facilitates propagating the oscillation of capacitor element 20 of the second structure to first and second mounting electrodes 34 and 35.

For capacitor element 10 of the first structure, in contrast, if solder 80 should form a fillet having a large height, capacitor element 10, having corner 19 without more strained regions 16 and 17 overlying it, is less susceptible to propagation of oscillation.

Capacitor element 10 of the first structure is thus more preferable than capacitor element 20 of the second structure as a capacitor element to be mounted on substrate-type terminal 30 according to the present preferred embodiment.

When electronic component mounted structure 100 according to the present preferred embodiment includes capacitor element 10 of the first structure mounted on substrate-type terminal 30, capacitor element 10 of the first structure includes dielectric layer 13 and internal electrode 12 stacked in layers in a direction parallel or substantially parallel to first major surface 31a of substrate-type terminal 30. This can limit the effect of the fillet of solder 80 and thus effectively reduce audible sound otherwise generated.

Second Preferred Embodiment

Hereinafter reference will be made to the drawings to describe an electronic component, a substrate-type terminal included therein, and an electronic component mounted structure according to a second preferred embodiment of the present invention. The present preferred embodiment provides an electronic component mounted structure 200 that is different from electronic component mounted structure 100 according to the first preferred embodiment mainly in their substrate-type terminals in structure, and accordingly, the remainder in configuration will not be described.

Figure 11:
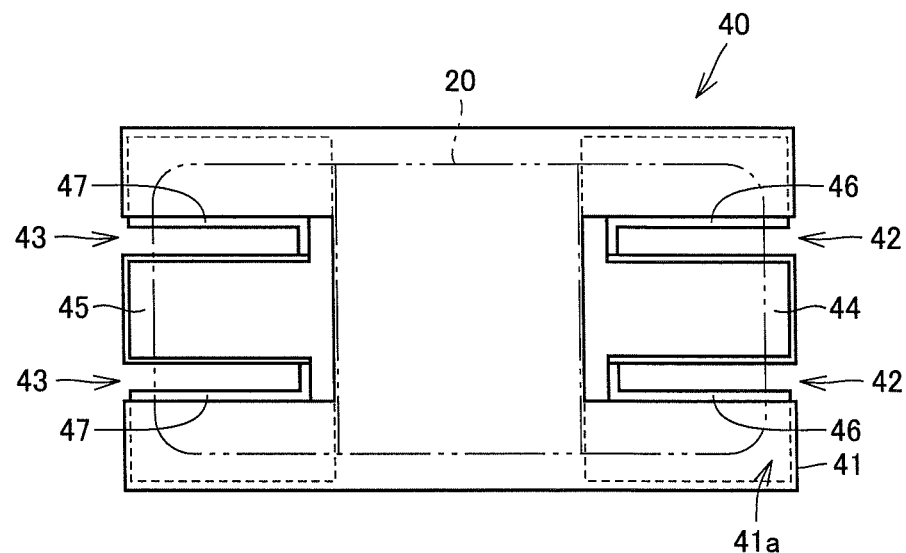
FIG. 11 is a view of a substrate-type terminal included in an electronic component according to a second preferred embodiment of the present invention, as seen at a first major surface.
Figure 12:
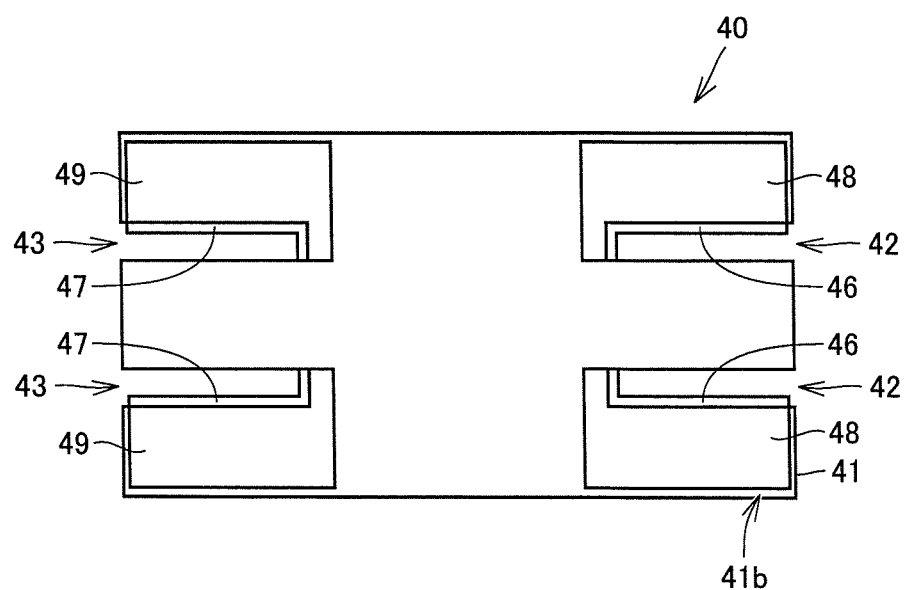
FIG. 12 is a view of the substrate-type terminal included in the electronic component according to the second preferred embodiment of the present invention, as seen at a second major surface.

FIG. 11 is a view of a substrate-type terminal included in an electronic component according to the second preferred embodiment of the present invention, as seen at a first major surface. FIG. 12 is a view of the substrate-type terminal included in the electronic component according to the present preferred embodiment, as seen at a second major surface.

As shown in FIGS. 11 and 12, the electronic component of the present preferred embodiment includes a substrate-type terminal 40 including an insulating substrate 41. Insulating substrate 41 preferably is rectangular or substantially rectangular.

Insulating substrate 41 includes a first major surface 41a to mount capacitor element 10, 20 thereon, and a second major surface 41b opposite to first major surface 41a, as will be described hereinafter.

Insulating substrate 41 can be formed of epoxy resin or a similar resin material, or alumina or a similar ceramic material. Furthermore, insulating substrate 41 may have an inorganic or organic filler or woven fabric added thereto. The present preferred embodiment provides insulating substrate 41 in the form of a glass epoxy substrate having a matrix of epoxy resin with glassy woven fabric added thereto.

As will be described hereinafter, for significantly reduced or minimized propagation of oscillation, insulating substrate 41 preferably has a thickness equal to or smaller than about 0.2 mm, more preferably equal to or smaller than about 0.1 mm, for example.

In view of reliably mounting capacitor elements 10 and 20, insulating substrate 41 preferably has a length that is about 0.8 times or larger, more preferably about 0.9 times or larger than capacitor elements 10 and 20. Insulating substrate 41 preferably has a width that is 0.8 times or larger, more preferably 0.9 times or larger that of capacitor elements 10 and 20, for example.

In view of reducing capacitor elements 10 and 20 in footprint, insulating substrate 31 preferably has a length that is about 2.0 times or smaller, more preferably about 1.5 times or smaller that of capacitor elements 10 and 20, for example. Insulating substrate 31 preferably has a width that is about 2.0 times or smaller, more preferably about 1.5 times or smaller that of capacitor elements 10 and 20, for example.

As shown in FIG. 11, substrate-type terminal 40 includes first major surface 41a with a first mounting electrode 44 electrically connected to first external electrodes 14 and 24 of capacitor elements 10 and 20, and a second mounting electrode 45 electrically connected to second external electrodes 15 and 25 of capacitor elements 10 and 20.

In other words, insulating substrate 41 includes first mounting electrode 44 on first major surface 41a at one longitudinally end portion of insulating substrate 41 and second mounting electrode 45 on first major surface 41a at the other longitudinally end portion of insulating substrate 41.

As shown in FIG. 12, substrate-type terminal 40 includes second major surface 41b with a first connecting electrode 48 provided for external connection and electrically connected to first mounting electrode 44, and a second connecting electrode 49 provided for external connection and electrically connected to second mounting electrode 45.

In other words, insulating substrate 41 includes first connecting electrode 48 on second major surface 41b at one longitudinally end portion of insulating substrate 41 and second connecting electrode 49 on second major surface 41b at the other longitudinally end portion of insulating substrate 41.

First mounting electrode 44 and first connecting electrode 48 are electrically connected by a first connecting conductor 46 provided on an internal surface of a first slit 42, which will be described hereinafter, provided in insulating substrate 41.

Second mounting electrode 45 and second connecting electrode 49 are electrically connected by a second connecting conductor 47 provided on an internal surface of a second slit 43, which will be described hereinafter, provided in insulating substrate 41.

Substrate-type terminal 40 includes first slit 42 located between first mounting electrode 44 and first connecting electrode 48, as seen in a plane, and penetrating the terminal from first major surface 41*a* to second major surface 41*b*, and second slit 43 located between second mounting electrode 45 and second connecting electrode 49, as seen in a plane, and penetrating the terminal from first major surface 41*a* to second major surface 41*b*. When the electronic component is seen in a plane, first slit 42 and second slit 43 at least partially overlap capacitor elements 10 and 20.

First slit 42 and second slit 43 are preferably formed using a drill, a dicer or the like. First slit 42 and second slit 43 extend in a longitudinal direction of substrate-type terminal 40.

In the present preferred embodiment, substrate-type terminal 40 includes two first slits 42 spaced from and opposite to each other, and two second slits 43 spaced from and opposite to each other.

Thus, first mounting electrode 44 is located between first slits 42, as seen in a plane. Second mounting electrode 45 is located between second slits 43, as seen in a plane.

Note that at least one first slit 42 suffices and so does second slit 43.

Furthermore, in the present preferred embodiment, first slit 42 and second slit 43 each include one end reaching an edge of insulating substrate 41 and thus opened as seen in a plane. Note that first slit 42 and second slit 43 are not limited in geometry to the above, and may not have an opening that reaches the edge of insulating substrate 41.

Hereinafter, electronic component mounted structure 200 including an electronic component that includes capacitor element 10, 20 and substrate-type terminal 40 connected to an external circuit board will be described.

Figure 13:
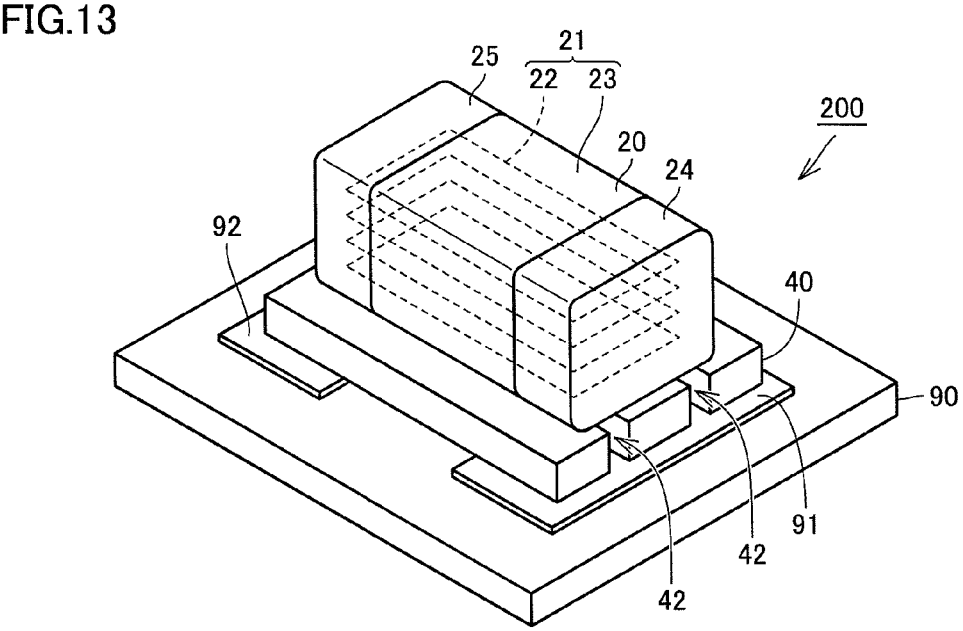
FIG. 13 is a perspective view of an electronic component mounted structure according to the second preferred embodiment of the present invention.
Figure 14:
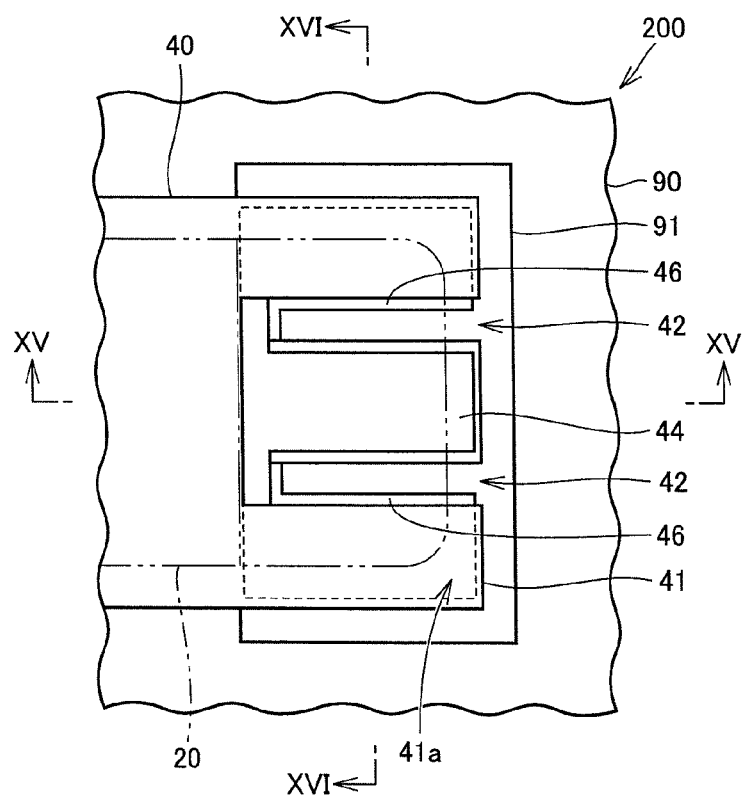
FIG. 14 is a plan view of the FIG. 13 electronic component mounted structure at one longitudinally end portion of the electronic component, as seen in a planar arrangement.
Figure 15:
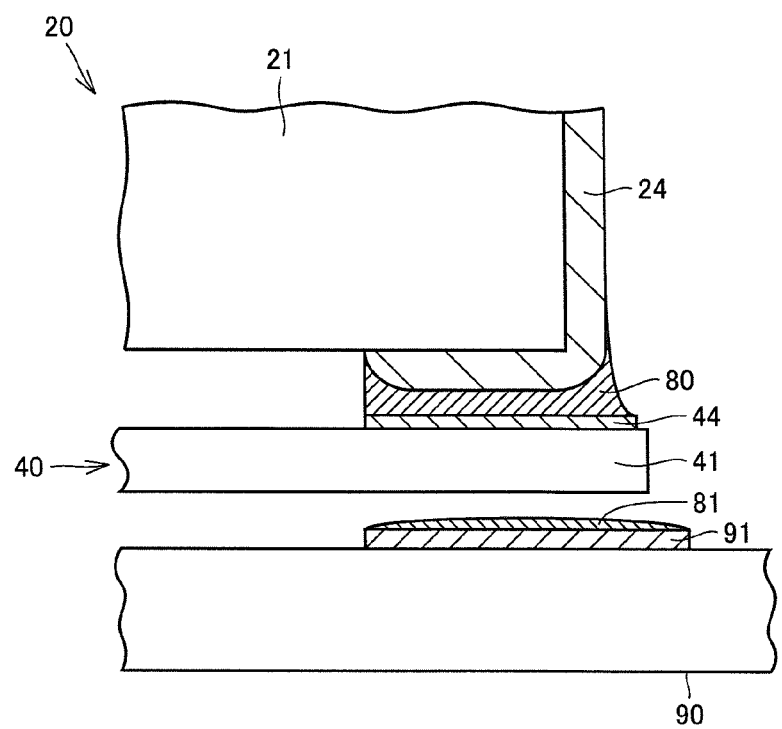
FIG. 15 is a partial cross section of the FIG. 14 electronic component mounted structure as seen in a direction indicated by an arrow XV-XV.
Figure 16:
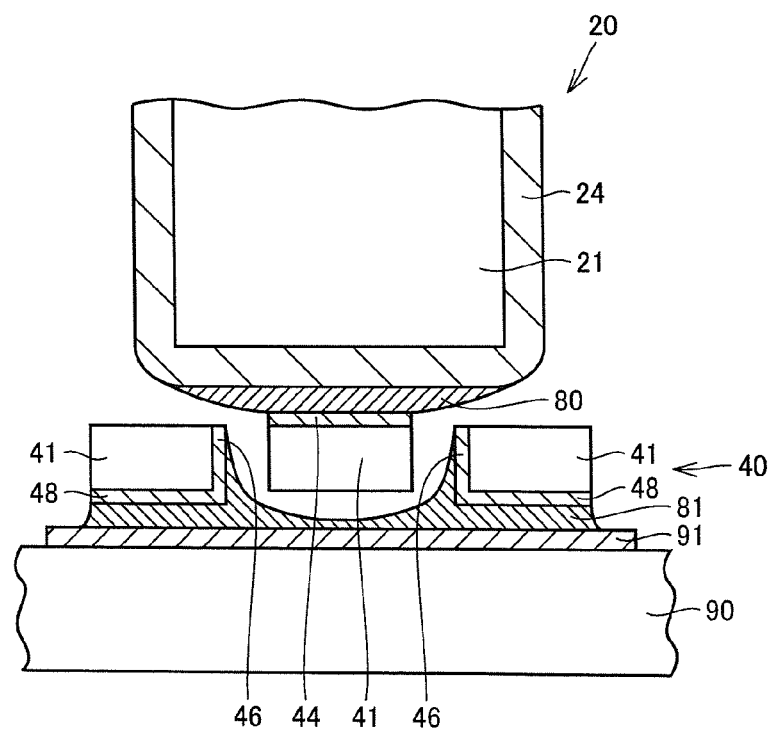
FIG. 16 is a partial cross section of the FIG. 14 electronic component mounted structure as seen in a direction indicated by an arrow XVI-XVI.

FIG. 13 is a perspective view of an electronic component mounted structure according to the present preferred embodiment. FIG. 14 is a plan view of the FIG. 13 electronic component mounted structure at one longitudinally end portion of the electronic component, as seen in a planar arrangement. FIG. 15 is a partial cross section of the FIG. 14 electronic component mounted structure as seen in a direction indicated by an arrow XV-XV. FIG. 16 is a partial cross section of the FIG. 14 electronic component mounted structure as seen in a direction indicated by an arrow XVI-XVI.

Note that FIG. 13 is a view for capacitor element 20 of the second structure. Furthermore, FIG. 14 perspectively shows capacitor element 20.

As shown in FIG. 13 to FIG. 16, the present preferred embodiment provides electronic component mounted structure 200 including capacitor element 10, 20, substrate-type terminal 40, and external circuit board 90.

While hereinafter the mounted structure will be described for the first external electrode of the capacitor element, the mounted structure is similarly described for the second external electrode of the capacitor element.

Capacitor element 10, 20 and substrate-type terminal 40 include first external electrode 14, 24 and first mounting electrode 44, respectively, electrically connected via solder 80 serving as a bonding agent. Substrate-type terminal 40 and external circuit board 90 include first connecting electrode 48 and first land 91, respectively, electrically connected by solder 81 serving as a bonding agent.

The above mounted structure allows capacitor elements 10 and 20 and external circuit board 90 to be mechanically and electrically interconnected via substrate-type terminal 40.

Specifically, first external electrode 14, 24, solder 80, first mounting electrode 44, first connecting conductor 46, first connecting electrode 48, solder 81, and first land 91 are electrically connected in this order to electrically connect capacitor element 10, 20 and external circuit board 90.

In electronic component mounted structure 200 when ac voltage or dc voltage with an ac component superimposed thereon is applied to capacitor element 10, 20 and the capacitor element oscillates, the oscillation propagates via solder 80 to first mounting electrode 44 of substrate-type terminal 40.

The oscillation propagated to first mounting electrode 44 is further propagated via insulating substrate 41 from first major surface 41*a* to second major surface 41*b* while traveling around and thus detouring first slit 42 and thus reaches first connecting electrode 48.

The oscillation thus travels an increased distance to propagate from first mounting electrode 44 to first connecting electrode 48. Furthermore, first slit 42 reduces insulating substrate 41 in rigidity and thus facilitates the insulating substrate to absorb the oscillation. In the present preferred embodiment, in particular, first slit 42 has one end open and thus allows the oscillation to be absorbed significantly effectively.

Thus, when the oscillation propagates through insulating substrate 41, the oscillation is damped and thus propagated to first connecting electrode 48 in a reduced amount. Accordingly, first connecting electrode 48 propagates reduced oscillation via solder 81 to first land 91. This results in reduced oscillation propagated to external circuit board 90, and hence reduced audible sound.

Note that when the oscillation propagated to first mounting electrode 44 is further propagated through insulating substrate 41 from first major surface 41*a* to second major surface 41*b* while traveling around and thus detouring first slit 42 and thus reaches first connecting electrode 48, it is damped in an amount, which is larger when the oscillation travels around first slit 42 via a detour smaller in rigidity. In other words, a detour smaller in rigidity contributes to limited propagation of oscillation, and hence reduced acoustic noise.

Accordingly, in view of reducing the detour in rigidity, it is preferable that insulating substrate 41 be smaller in thickness. Specifically, insulating substrate 41 is preferably about 0.2 mm or smaller, more preferably about 0.1 mm or smaller in thickness, for example.

It should be noted, however, that when insulating substrate 41 is excessively small in thickness, solder 81 may creep up and thus reach capacitor element 10, 20 and thus forma fillet on an end surface of capacitor element 10, 20. This is not preferable as the oscillation propagates from capacitor element 10, 20 to external circuit board 90 via the fillet of solder 81.

To prevent solder 81 from creeping up, it is preferable that insulating substrate 41 be about 0.05 mm or larger in thickness, for example.

Note that in the present preferred embodiment, as shown in FIG. 13, capacitor elements 10 and 20 have their longitudinally end portions connected at their widthwise center portions to first and second mounting electrodes 44 and 45. As shown in FIG. 3 and FIG. 4, capacitor element 10 of the first structure at the longitudinally end portions at their widthwise center portions has more strained regions 16 and 17.

As such, when capacitor element 10 of the first structure is mounted on substrate-type terminal 40, its oscillation is easily propagated to first and second mounting electrodes 34 and 35, which is not preferable.

In contrast, capacitor element 20 of the second structure at the longitudinally end portions at their widthwise center portions has region 18 less strained at a depthwise lower portion to which solder 80 is mainly applied.

Accordingly, connecting capacitor element 20 of the second structure at the longitudinally end portions at their widthwise center portions to first and second mounting electrodes 44 and 45 effectively significantly reduces or prevents the oscillation of capacitor element 20 of the second structure that would otherwise be propagated to first and second mounting electrodes 44 and 45.

Capacitor element 20 of the second structure is thus more preferable than capacitor element 10 of the first structure as a capacitor element to be mounted on substrate-type terminal 40 according to the present preferred embodiment.

When electronic component mounted structure 200 according to the present preferred embodiment includes capacitor element 20 of the second structure mounted on substrate-type terminal 40, capacitor element 20 of the second structure includes dielectric layer and internal electrode 22 stacked in layers in a direction perpendicular or substantially perpendicular to first major surface 41a of substrate-type terminal 40. This limits propagation of oscillation, as described above, and thus effectively reduce audible sound otherwise generated.

Third Preferred Embodiment

Hereinafter will be described an electronic component, a substrate-type terminal included therein, and an electronic component mounted structure according to a third preferred embodiment of the present invention. The present preferred embodiment provides an electronic component mounted structure that is different from electronic component mounted structures 100, 200 of the first and second preferred embodiments simply in that the former further includes a resist to close the slits of the substrate-type terminal, and accordingly, the remainder in configuration will not be described repeatedly.

Figure 17:
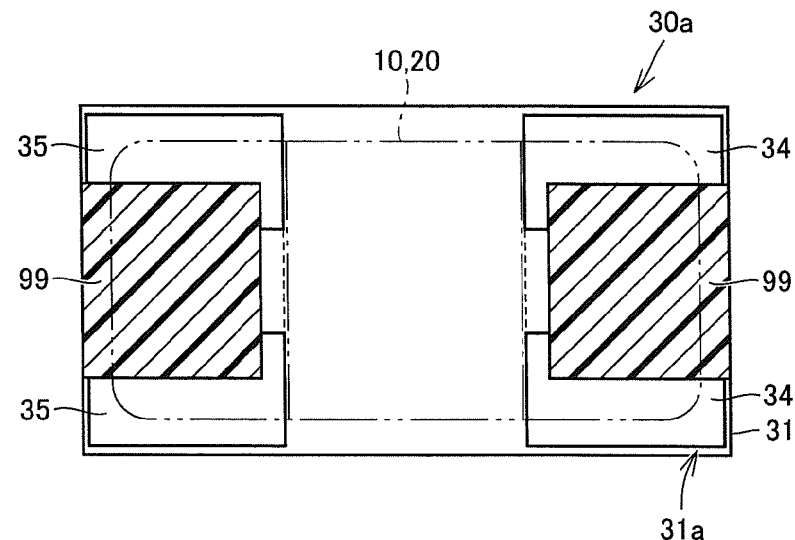
FIG. 17 is a view of a substrate-type terminal included in an electronic component according to a third preferred embodiment of the present invention, as seen at a first major surface.
Figure 18:
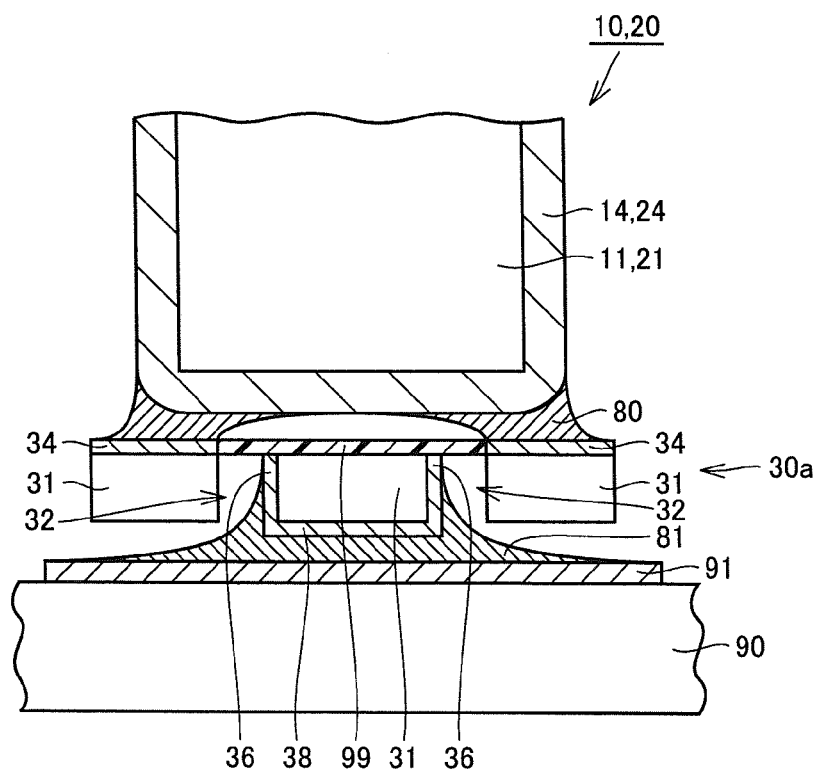
FIG. 18 is a partial cross section of an electronic component mounted structure according to the third preferred embodiment of the present invention.

FIG. 17 is a view of a substrate-type terminal included in an electronic component according to the third preferred embodiment of the present invention, as seen at a first major surface. FIG. 18 is a partial cross section of an electronic component mounted structure according to the present preferred embodiment. Note that FIG. 18 is a view in cross section seen in the same manner as FIG. 10.

The electronic component mounted structure according to the present preferred embodiment corresponds to electronic component mounted structure 100 according to the first preferred embodiment plus resist 99 as will be described hereinafter.

As shown in FIG. 17 and FIG. 18, the third preferred embodiment of the present invention provides an electronic component including a substrate-type terminal 30a including first and second slits closed by resist 99 provided on first major surface 31a.

Specifically, as seen in a plane, first mounting electrodes 34 have a space therebetween closed by resist 99, and so do second mounting electrodes 35. Resist 99 closes first slit 32 and second slit 33 at upper portions, respectively.

Resist 99 is preferably in the form of a sheet to maintain the form of a flat plate. It should be noted, however, that resist 99 is not limited to the form of the sheet and may alternatively be a viscous liquid resist having been cured.

While hereinafter the mounted structure will be described for the first external electrode of the capacitor element, the mounted structure is similarly described for the second external electrode of the capacitor element.

Resist 99 that closes first slit 32 prevents solder 81 from providing a fillet creeping up through first slit 32 and thus adhering to first mounting electrode 34 or first external electrode 14.

This prevents the oscillation of capacitor element 10, 20 from propagating through first slit 32, rather than detouring it, via solder 81 to external circuit board 90 via a short circuit.

As a result, first slit 32 allows the oscillation to travel an increased distance from first mounting electrode 34 to propagate to first connecting electrode 38 and thus ensures that the oscillation propagating through insulating substrate 31 is effectively damped.

The present preferred embodiment thus provides an electronic component mounted structure that reliably reduces audible sound caused as oscillation is propagated to external circuit board 90.

Note that the present preferred embodiment provides an electronic component mounted structure with resist 99 on first major surface 31a, it may include resist 99 on second major surface 31b.

Hereinafter will be described an electronic component mounted structure according to the present preferred embodiment in an exemplary variation to provide electronic component mounted structure 200 according to the second preferred embodiment plus resist 99.

Figure 19:
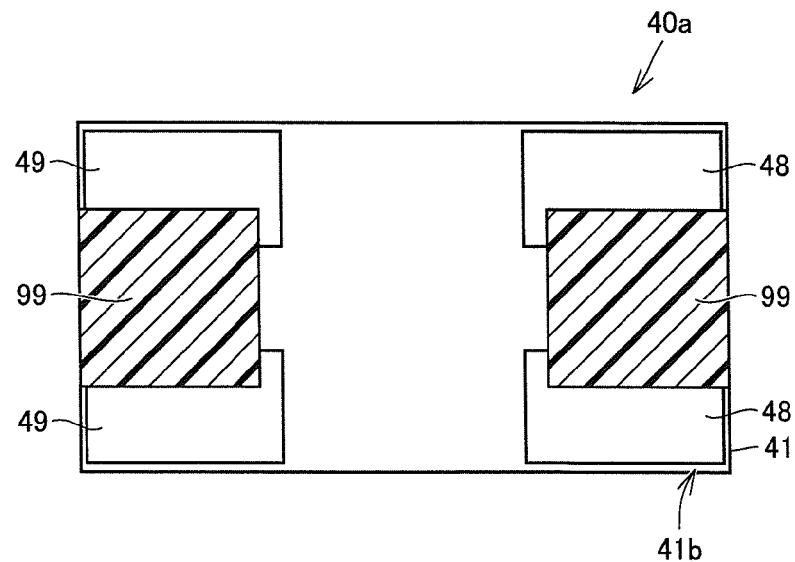
FIG. 19 is a view of a substrate-type terminal included in an electronic component according to the third preferred embodiment of the present invention in an exemplary variation, as seen at a first major surface.
Figure 20:
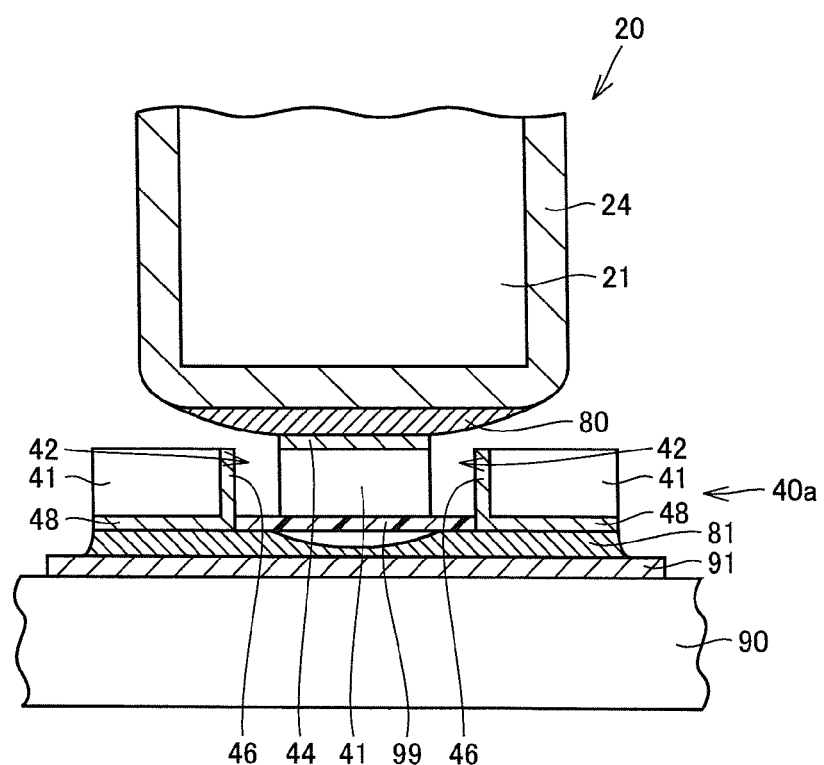
FIG. 20 is a partial cross section of an electronic component mounted structure according to the same preferred embodiment shown in FIG. 19.

FIG. 19 is a view of a substrate-type terminal included in an electronic component according to the present preferred embodiment in the exemplary variation, as seen at a first major surface. FIG. 20 is a partial cross section of an electronic component mounted structure according to the present preferred embodiment. Note that FIG. 20 is a view in cross section seen in the same manner as FIG. 16.

As shown in FIG. 19 and FIG. 20, the present preferred embodiment in the exemplary variation provides an electronic component including a substrate-type terminal 40a including first and second slits closed by resist 99 provided on second major surface 41b.

Specifically, as seen in a plane, first connecting electrodes 48 have a space therebetween closed by resist 99, and so do second connecting electrodes 49. Resist 99 closes first slit 42 and second slit 43 at lower portions, respectively.

While hereinafter the mounted structure will be described for the first external electrode of the capacitor element, the mounted structure is similarly described for the second external electrode of the capacitor element.

Resist 99 that closes first slit 42 prevents solder 81 from providing a fillet creeping up through first slit 42.

This prevents the oscillation of capacitor element 10, 20 from propagating through first slit 42, rather than detouring it, via solder 81 to external circuit board 90 via a short circuit.

As a result, first slit 42 allows the oscillation to travel an increased distance from first mounting electrode 44 to propagate to first connecting electrode 48 and thus ensures that the oscillation propagating through insulating substrate 41 is effectively damped.

The present preferred embodiment in the exemplary variation thus provide an electronic component mounted structure that reliably reduces audible sound caused as oscillation is propagated to external circuit board 90.

Note that the present preferred embodiment in the exemplary variation provides an electronic component mounted structure with resist 99 on second major surface 41b, it may include resist 99 on first major surface 41a.

Fourth Preferred Embodiment

Hereinafter will be described an electronic component, a substrate-type terminal included therein, and an electronic component mounted structure according to a fourth preferred embodiment of the present invention. The present preferred embodiment provides an electronic component mounted structure that is different from electronic component mounted structures 100, 200 of the first and second preferred embodiments simply in that the former includes a notched substrate-type terminal, and accordingly, the remainder in configuration will not be described repeatedly.

Figure 21:
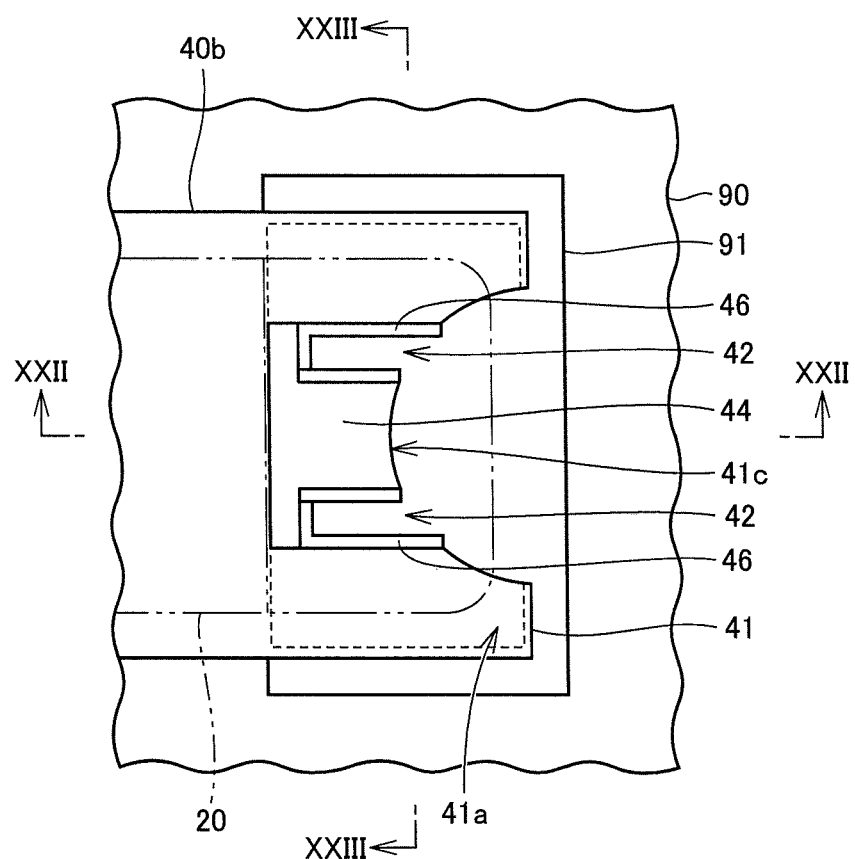
FIG. 21 is a plan view of an electronic component mounted structure according to a fourth preferred embodiment of the present invention at one longitudinally end portion of the electronic component, as seen in a planar arrangement.
Figure 22:
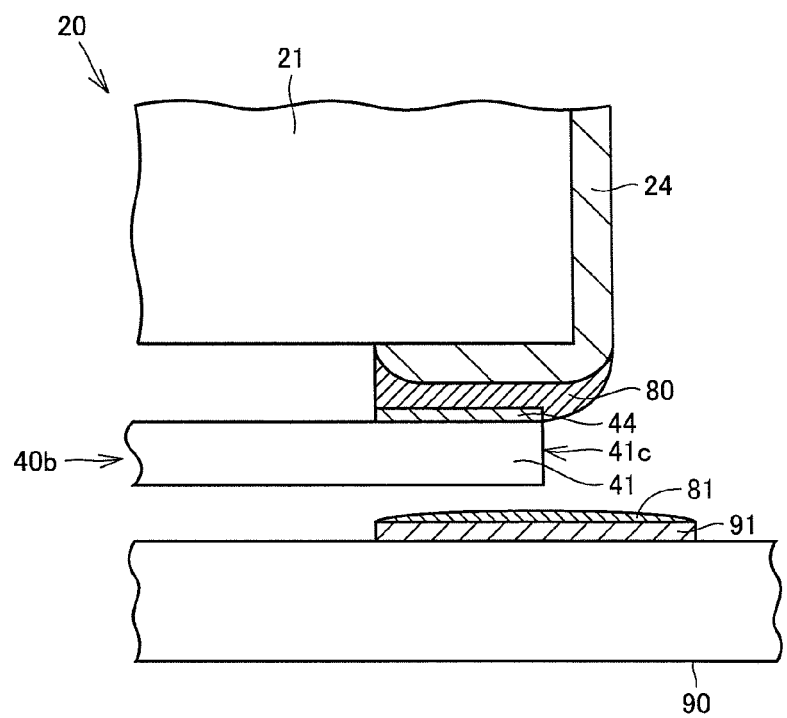
FIG. 22 is a partial cross section of the FIG. 21 electronic component mounted structure as seen in a direction indicated by an arrow XXII-XXII.
Figure 23:
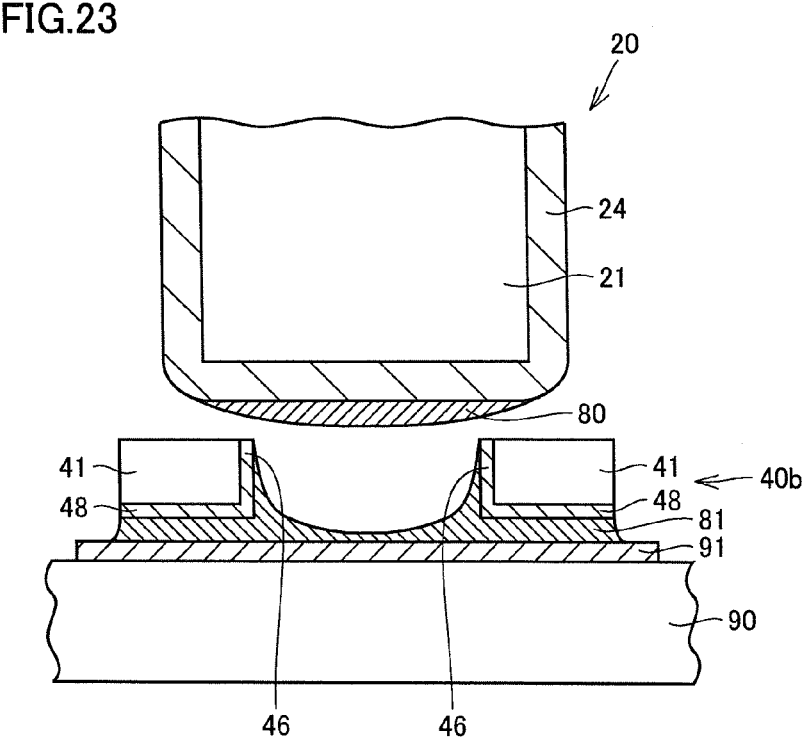
FIG. 23 is a partial cross section of the FIG. 21 electronic component mounted structure as seen in a direction indicated by an arrow XXIII-XXIII.

FIG. 21 is a plan view of an electronic component mounted structure according to the fourth preferred embodiment of the present invention at one longitudinally end portion of the electronic component, as seen in a planar arrangement. FIG. 22 is a partial cross section of the FIG. 21 electronic component mounted structure as seen in a direction indicated by an arrow XXII-XXII. FIG. 23 is a partial cross section of the FIG. 21 electronic component mounted structure as seen in a direction indicated by an arrow XXIII-XXIII. Note that FIG. 21 perspectively shows capacitor element 20.

The electronic component mounted structure according to the present preferred embodiment corresponds to electronic component mounted structure 200 according to the second preferred embodiment with substrate-type terminal 40 having a notch 41c as will be described hereinafter. While hereinafter the mounted structure will be described for the first external electrode of the capacitor element, the mounted structure is similarly described for the second external electrode of the capacitor element.

As shown in FIG. 21 to FIG. 23, the fourth preferred embodiment of the present invention provides an electronic component mounted structure including a substrate-type terminal 40b including an edge having first slits 42 with a notch 41c therebetween and second slits with notch 41c therebetween, as seen in a plane. First slit 42 and the second slit each include one end reaching notch 41c and thus open.

Specifically, as seen in a plane, substrate-type terminal 40b includes one and the other longitudinally end portions both including widthwise center portions, respectively, with notch 41c in the form of an arc. Notch 41c is formed preferably using a drill, a dicer or the like. Note that notch 41c is not limited in geometry to the arc, as seen in a plane, and may alternatively be rectangular or polygonal, for example.

As shown in FIG. 22 and FIG. 23, notch 41c defines a space, which can accommodate solder 81. This prevents solder 81 providing a fillet creeping up through first slit 42.

This can in turn prevent the oscillation of capacitor element 10, 20 that would otherwise be propagated through first slit 42, rather than detour it, via solder 81 to external circuit board 90 via a short circuit.

As a result, first slit 42 allows the oscillation to travel an increased distance from first mounting electrode 44 to propagate to first connecting electrode 48 and thus ensures that the oscillation propagating through insulating substrate 41 is constantly damped.

The present preferred embodiment thus provides an electronic component mounted structure that reliably reduces audible sound caused as oscillation is propagated to external circuit board 90.

Note that electronic component mounted structure 100 according to the first preferred embodiment with substrate-type terminal 30 including notch 41c is similarly effective.

Fifth Preferred Embodiments

Hereinafter will be described an electronic component, a substrate-type terminal included therein, and an electronic component mounted structure according to a fifth preferred embodiment of the present invention. The present preferred embodiment provides an electronic component mounted structure that is different from electronic component mounted structures 100, 200 of the first and second preferred embodiments simply in that the former includes a substrate-type terminal including a slit with one end that is not opened, and accordingly, the remainder in configuration will not be described repeatedly.

Figure 24:
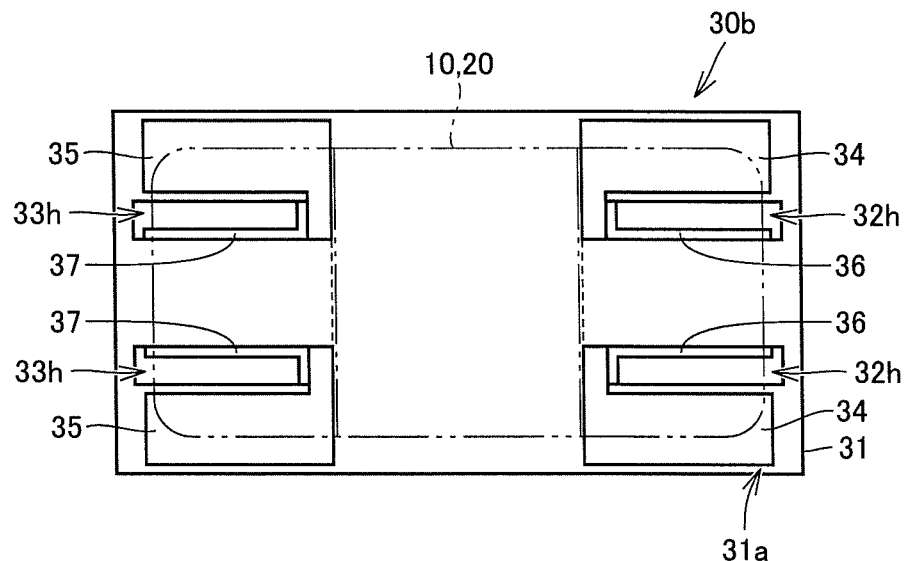
FIG. 24 is a view of a substrate-type terminal included in an electronic component according to a fifth preferred embodiment of the present invention, as seen at a first major surface.
Figure 25:
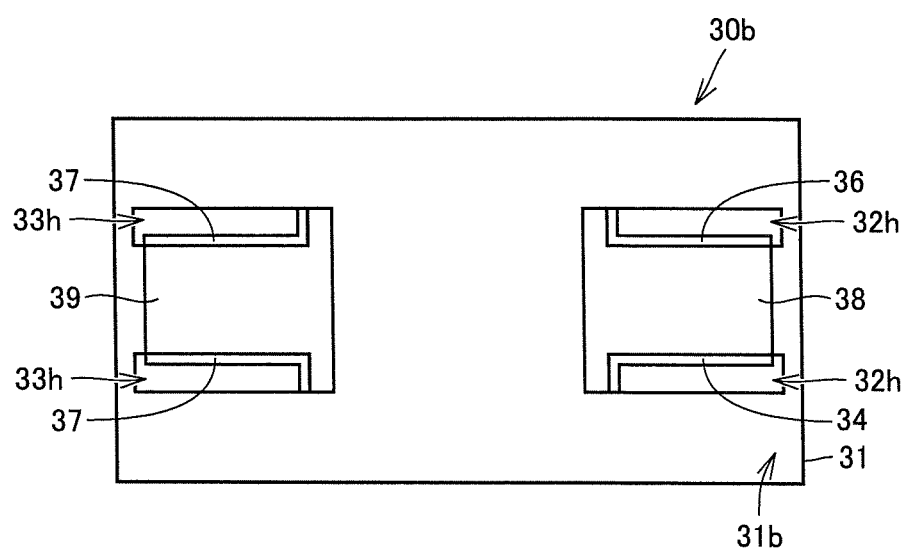
FIG. 25 is a view of the substrate-type terminal included in the electronic component according to the fifth preferred embodiment of the present invention, as seen at a second major surface.

FIG. 24 is a view of a substrate-type terminal included in an electronic component according to the fifth preferred embodiment of the present invention, as seen at a first major surface. FIG. 25 is a view of the substrate-type terminal included in the electronic component according to the present preferred embodiment, as seen at a second major surface.

As shown in FIG. 24 and FIG. 25, the fifth preferred embodiment of the present invention provides an electronic component including a substrate-type terminal 30b including first 32h and second 33h slits extending in a longitudinal direction of substrate-type terminal 30b without having an opening reaching an edge of insulating substrate 31.

While substrate-type terminal 30b including first slit 32h and second slit 33h is inferior in performance in absorbing oscillation to substrate-type terminals 30 and 40 included in the electronic components according to the first and second preferred embodiments, the former allows oscillation to travel an increased distance and thus propagate, and thus be damped while propagating through insulating substrate 31.

The present preferred embodiment thus also provides an electronic component mounted structure including substrate-type terminal 30b, that reduces audible sound otherwise generated.

Sixth Preferred Embodiment

Hereinafter will be described an electronic component, a substrate-type terminal included therein, and an electronic component mounted structure according to a sixth preferred embodiment of the present invention. The present preferred embodiment provides an electronic component mounted structure that is different from electronic component mounted structures 100, 200 of the first and second preferred embodiments simply in that the former includes a substrate-type terminal including only a single first slit and only a single second slit, and accordingly, the remainder in configuration will not be described repeatedly.

Figure 26:
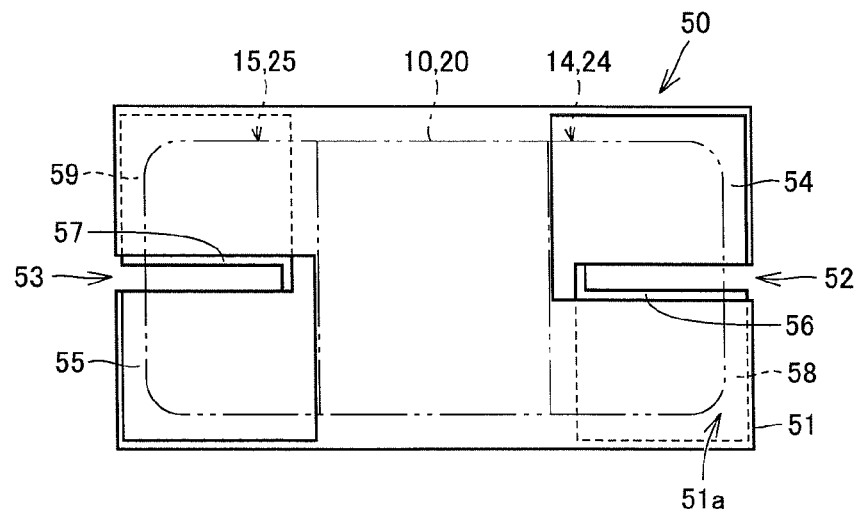
FIG. 26 is a view of a substrate-type terminal included in an electronic component according to a sixth preferred embodiment of the present invention, as seen at a first major surface.

FIG. 26 is a view of a substrate-type terminal included in an electronic component according to the sixth preferred embodiment of the present invention, as seen at a first major surface. As shown in FIG. 26, the present invention in the sixth preferred embodiment provides an electronic component including a substrate-type terminal 50 including an insulating substrate 51. Insulating substrate 51 is rectangular or substantially rectangular.

Insulating substrate 51 includes a first major surface 51a to mount capacitor element 10, 20 thereon, and a second major surface opposite to first major surface 51a.

As shown in FIG. 26, substrate-type terminal 50 includes first major surface 51a with a first mounting electrode 54 electrically connected to first external electrodes 14 and 24 of capacitor elements 10 and 20, and a second mounting electrode 55 electrically connected to second external electrodes 15 and 25 of capacitor elements 10 and 20.

In other words, insulating substrate 51 includes first mounting electrode 54 on first major surface 51a at one longitudinally end portion of insulating substrate 51 and second mounting electrode 55 on first major surface 51a at the other longitudinally end portion of insulating substrate 51. Note that first mounting electrode 54 and second mounting electrode 55 are located on a diagonal line of first major surface 51a.

Substrate-type terminal 50 includes the second major surface with a first connecting electrode 58 provided for external connection and electrically connected to first mounting electrode 54, and a second connecting electrode 59 provided for external connection and electrically connected to second mounting electrode 55.

In other words, insulating substrate 51 includes first connecting electrode 58 on the second major surface at one longitudinally end portion of insulating substrate 51 and second connecting electrode 59 on the second major surface at the other longitudinally end portion of insulating substrate 51. Note that first connecting electrode 58 and second connecting electrode 59 are located on a diagonal line of the second major surface.

First mounting electrode 54 and first connecting electrode 58 are electrically connected by a first connecting conductor 56 provided on an internal surface of a first slit 52 provided in insulating substrate 51.

Second mounting electrode 55 and second connecting electrode 59 are electrically connected by a second connecting conductor 57 provided on an internal surface of a second slit 53 provided in insulating substrate 51.

Substrate-type terminal 50 includes first slit 52 located between first mounting electrode 54 and first connecting electrode 58, as seen in a plane, and penetrating the terminal from first major surface 51a to the second major surface, and second slit 53 located between second mounting electrode 55 and second connecting electrode 59, as seen in a plane, and penetrating the terminal from first major surface 51a to the second major surface. When the electronic component is seen in a plane, first slit 52 and second slit 53 at least partially overlap capacitor elements 10 and 20.

In the present preferred embodiment, substrate-type terminal 50 includes a single first slit 52 and a single second slit 53 located on a single straight line. First slit 52 and second slit 53 extend in a longitudinal direction of substrate-type terminal 50.

Furthermore, in the present preferred embodiment, first slit 52 and second slit 53 each include one end reaching an edge of insulating substrate 51 and thus opened as seen in a plane. Note that first slit 52 and second slit 53 are not limited in geometry to the above, and may not have an opening that reaches the edge of insulating substrate 51.

The present preferred embodiment thus also provides substrate-type terminal 50 that allows oscillation to travel an increased distance to propagate, and thus effectively be damped while propagating through insulating substrate 51. The present preferred embodiment thus also provides an electronic component mounted structure including substrate-type terminal 50, that reduces audible sound otherwise generated.

Seventh Preferred Embodiment

Hereinafter will be described an electronic component, a substrate-type terminal included therein, and an electronic component mounted structure according to a seventh preferred embodiment of the present invention. The present preferred embodiment provides an electronic component mounted structure that is different from that of the sixth preferred embodiment simply in that the former includes a substrate-type terminal having first and second slits extending in a widthwise direction of the substrate-type terminal, and accordingly, the remainder in configuration will not be described repeatedly.

Figure 27:
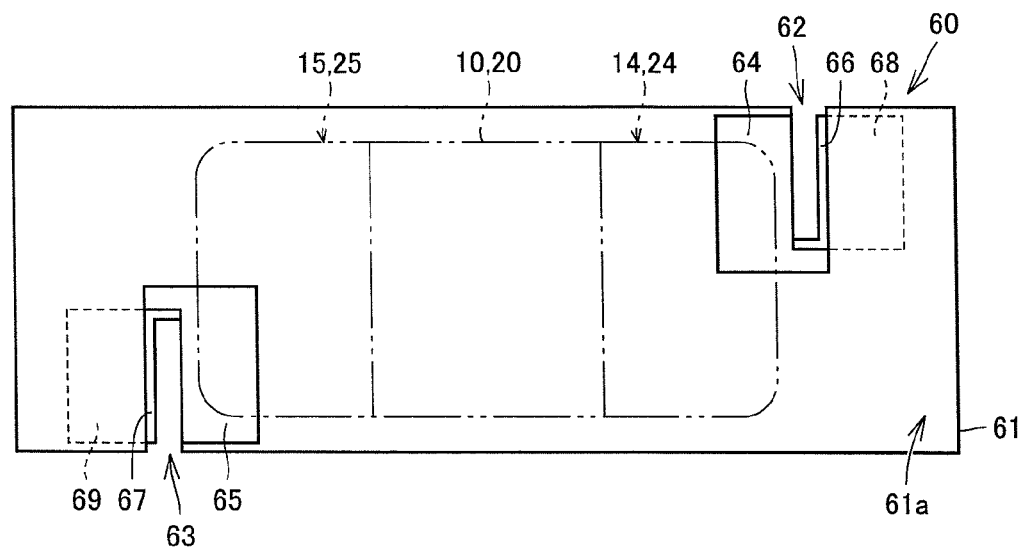
FIG. 27 is a view of a substrate-type terminal included in an electronic component according to a seventh preferred embodiment of the present invention, as seen at a first major surface.

FIG. 27 is a view of a substrate-type terminal included in an electronic component according to the seventh preferred embodiment of the present invention, as seen at a first major surface. As shown in FIG. 27, the present invention in the seventh preferred embodiment provides an electronic component including a substrate-type terminal 60 including an insulating substrate 61. Insulating substrate 61 is rectangular or substantially rectangular.

Insulating substrate 61 includes a first major surface 61a to mount capacitor element 10, 20 thereon, and a second major surface opposite to first major surface 61a.

As shown in FIG. 27, substrate-type terminal 60 includes first major surface 61a with a first mounting electrode 64 electrically connected to first external electrodes 14 and 24 of capacitor elements 10 and 20, and a second mounting electrode 65 electrically connected to second external electrodes 15 and 25 of capacitor elements 10 and 20.

In other words, insulating substrate 61 includes first mounting electrode 64 on first major surface 61a at one longitudinally end portion of insulating substrate 61 and second mounting electrode 65 on first major surface 61a at the other longitudinally end portion of insulating substrate 61. Note that first mounting electrode 64 and second mounting electrode 65 are located on a diagonal line of first major surface 61a.

Substrate-type terminal 60 includes the second major surface with a first connecting electrode 68 provided for external connection and electrically connected to first mounting electrode 64, and a second connecting electrode 69 provided for external connection and electrically connected to second mounting electrode 65.

In other words, insulating substrate 61 includes first connecting electrode 68 on the second major surface at one longitudinally end portion of insulating substrate 61 and second connecting electrode 69 on the second major surface at the other longitudinally end portion of insulating substrate 61. Note that first connecting electrode 68 and second connecting electrode 69 are located on a diagonal line of the second major surface.

First mounting electrode 64 and first connecting electrode 68 are electrically connected by a first connecting conductor 66 provided on an internal surface of a first slit 62 provided in insulating substrate 61.

Second mounting electrode 65 and second connecting electrode 69 are electrically connected by a second connecting conductor 67 provided on an internal surface of a second slit 63 provided in insulating substrate 61.

Substrate-type terminal 60 includes first slit 62 located between first mounting electrode 64 and first connecting electrode 68, as seen in a plane, and penetrating the terminal from first major surface 61a to the second major surface, and second slit 63 located between second mounting electrode 65 and second connecting electrode 69, as seen in a plane, and penetrating the terminal from first major surface 61a to the second major surface. When the electronic component is seen in a plane, first slit 62 and second slit 63 at least partially overlap capacitor elements 10 and 20.

In the present preferred embodiment, substrate-type terminal 60 includes a single first slit 62 and a single second slit 63. First slit 62 and second slit 63 extend in a widthwise direction of substrate-type terminal 60.

Furthermore, in the present preferred embodiment, first slit 62 and second slit 63 each include one end reaching an edge of insulating substrate 61 and thus opened as seen in a plane. First slit 62 includes an opening at one widthwise lateral surface of substrate-type terminal 60. Second slit 63 includes an opening at the other widthwise lateral surface of substrate-type terminal 60. Note that first slit 62 and second slit 63 are not limited in geometry to the above, and may not have an opening that reaches the edge of insulating substrate 61.

The present preferred embodiment thus also provides substrate-type terminal 60 that allows oscillation to travel an increased distance to propagate, and thus effectively be damped while propagating through insulating substrate 61. The present preferred embodiment thus also provides an electronic component mounted structure including substrate-type terminal 60, that reduces audible sound otherwise generated.

While the present preferred embodiment provides substrate-type terminal 60 that, as seen in a plane, includes first slit 62 and second slit 63 with first mounting electrode 64 and second mounting electrode 65 therebetween, the substrate-type terminal may include first slit 62 and second slit 63 with first connecting electrode 68 and second connecting electrode 69 therebetween.

While the above preferred embodiments have been described for an electronic component including a capacitor element, the electronic component may not include a capacitor element and instead include an element having at least two external electrodes and strained when voltage is applied thereto, e.g., a coil element, a piezoelectric element, and/or the like.

Although preferred embodiments of the present invention have been described and illustrated in detail, it is clearly understood that the same is by way of illustration and example only and is not to be taken by way of limitation, the scope of the present invention being interpreted by the terms of the appended claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component comprising:
    a capacitor element including a stack of layers including a dielectric layer and an internal electrode stacked alternately in layers, a first external electrode provided at one longitudinally end portion of the stack of layers, and a second external electrode provided at the other longitudinally end portion of the stack of layers; and
    a substrate-type terminal including a first major surface and a second major surface opposite to the first major surface, and including the capacitor element mounted on the first major surface; wherein
    the substrate-type terminal includes on the first major surface a first mounting electrode electrically connected to the first external electrode of the capacitor element and a second mounting electrode electrically connected to the second external electrode of the capacitor element;
    the substrate-type terminal includes on the second major surface a first connecting electrode provided for external connection and electrically connected to the first mounting electrode and a second connecting electrode provided for external connection and electrically connected to the second mounting electrode;
    the substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface; and
    when viewed in a direction perpendicular to the first major surface of the substrate-type terminal, the first and second slits each have a longer side and a shorter side that extends perpendicular or substantially perpendicular to the longer side, and portions of the first mounting electrode and the first connecting electrode which are adjacent to the first slit in a direction of the shorter side of the first slit do not overlap each other and portions of the second mounting electrode and the second connecting electrode which are adjacent to the second slit in a direction of the shorter side of the second slit do not overlap each other.

2. The electronic component according to claim 1, wherein the first slit and the second slit each include one end extending to an edge of the substrate-type terminal and open as seen in a plane.

3. The electronic component according to claim 1, wherein the capacitor element is mounted with the dielectric layer and the internal electrode stacked in layers in a direction parallel or substantially parallel to the first major surface of the substrate-type terminal.

4. The electronic component according to claim 1, wherein the capacitor element is mounted with the dielectric layer and the internal electrode stacked in layers in a direction perpendicular or substantially perpendicular to the first major surface of the substrate-type terminal.

5. The electronic component according to claim 3, wherein
    the substrate-type terminal includes two of the first slits spaced from and opposite to each other and two of the second slits spaced from and opposite to each other;
    the first connecting electrode is located between the first slits, as seen in a plane; and
    the second connecting electrode is located between the second slits, as seen in a plane.

6. The electronic component according to claim 4, wherein
    the substrate-type terminal includes two of the first slits spaced from and opposite to each other and two of the second slits spaced from and opposite to each other;
    the first mounting electrode is located between the first slits, as seen in a plane; and
    the second mounting electrode is located between the second slits, as seen in a plane.

7. The electronic component according to claim 1, wherein the first and second slits are closed by a resist provided on one of the first major surface and the second major surface.

8. The electronic component according to claim 5, wherein
    the substrate-type terminal, as seen in a plane, includes an edge with a notch; and
    the first and second slits each include one end extending to the notch and open, as seen in a plane.

9. A substrate-type terminal configured to have mounted thereon a capacitor element including a stack of layers including a dielectric layer and an internal electrode stacked alternately in layers, a first external electrode provided at one longitudinally end portion of the stack of layers, and a second external electrode provided at the other longitudinally end portion of the stack of layers, the substrate-type terminal comprising:
a first major surface to mount the capacitor element thereon;
a second major surface opposite to the first major surface;
a first mounting electrode located on the first major surface and electrically connected to the first external electrode of the capacitor element;
a second mounting electrode located on the first major surface and electrically connected to the second external electrode of the capacitor element;
a first connecting electrode located on the second major surface, provided for external connection and electrically connected to the first mounting electrode;
a second connecting electrode located on the second major surface, provided for external connection and electrically connected to the second mounting electrode;
a first slit located between the first mounting electrode and the first connecting electrode, as seen in a plane, and penetrating the terminal from the first major surface to the second major surface; and
a second slit located between the second mounting electrode and the second connecting electrode, as seen in a plane, and penetrating the terminal from the first major surface to the second major surface; wherein
when viewed in a direction perpendicular to the first major surface of the substrate-type terminal, the first and second slits each have a longer side and a shorter side that extends perpendicular or substantially perpendicular to the longer side, and portions of the first mounting electrode and the first connecting electrode which are adjacent to the first slit in a direction of the shorter side of the first slit do not overlap each other and portions of the second mounting electrode and the second connecting electrode which are adjacent to the second slit in a direction of the shorter side of the second slit do not overlap each other.

10. The substrate-type terminal according to claim 9, wherein the first slit and the second slit each include one end extending to an edge of the substrate-type terminal and open as seen in a plane.

11. The substrate-type terminal according to claim 9, wherein the substrate-type terminal is configured such that capacitor element is mounted with the dielectric layer and the internal electrode stacked in layers in a direction parallel or substantially parallel to the first major surface of the substrate-type terminal.

12. The substrate-type terminal according to claim 9, wherein the substrate-type terminal is configured such that the capacitor element is mounted with the dielectric layer and the internal electrode stacked in layers in a direction perpendicular or substantially perpendicular to the first major surface of the substrate-type terminal.

13. The substrate-type terminal according to claim 11, further comprising:
two of the first slits spaced from and opposite to each other and two of the second slits spaced from and opposite to each other; wherein
the first connecting electrode is located between the first slits, as seen in a plane; and
the second connecting electrode is located between the second slits, as seen in a plane.

14. The substrate-type terminal according to claim 12, further comprising:
two of the first slits spaced from and opposite to each other and two of the second slits spaced from and opposite to each other; wherein
the first mounting electrode is located between the first slits, as seen in a plane; and
the second mounting electrode is located between the second slits, as seen in a plane.

15. The substrate-type terminal according to claim 9, wherein the first and second slits are closed by a resist provided on one of the first major surface and the second major surface.

16. The substrate-type terminal according to claim 13, further comprising a notch, as seen in a plane; wherein
the first and second slits each include one end extending to the notch and open, as seen in a plane.

17. An electronic component mounted structure comprising:
a capacitor element including a stack of layers including a dielectric layer and an internal electrode stacked alternately in layers, a first external electrode provided at one longitudinally end portion of the stack of layers, and a second external electrode provided at the other longitudinally end portion of the stack of layers;
a substrate-type terminal including a first major surface and a second major surface opposite to the first major surface, and including the capacitor element mounted on the first major surface; and
an external circuit board including a surface with a first land and a second land and having the substrate-type terminal connected thereto; wherein
the substrate-type terminal includes on the first major surface a first mounting electrode electrically connected to the first external electrode of the capacitor element and a second mounting electrode electrically connected to the second external electrode of the capacitor element;
the substrate-type terminal includes on the second major surface a first connecting electrode electrically connected to the first mounting electrode and the first land and a second connecting electrode electrically connected to the second mounting electrode and the second land;
the substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface; and
when viewed in a direction perpendicular to the first major surface of the substrate-type terminal, the first and second slits each have a longer side and a shorter side that extends perpendicular or substantially perpendicular to the longer side, and portions of the first mounting electrode and the first connecting electrode which are adjacent to the first slit in a direction of the shorter side of the first slit do not overlap each other and portions of the second mounting electrode and the second connecting electrode which are adjacent to the second slit in a direction of the shorter side of the second slit do not overlap each other.

18. The electronic component mounted structure according to claim 17, wherein the first slit and the second slit each include one end extending to an edge of the substrate-type terminal and open as seen in a plane.

19. The electronic component mounted structure according to claim 17, wherein the capacitor element is mounted with the dielectric layer and the internal electrode stacked in layers in a direction parallel or substantially parallel to the first major surface of the substrate-type terminal.

20. The electronic component mounted structure according to claim 17, wherein the capacitor element is mounted with the dielectric layer and the internal electrode stacked in layers in a direction perpendicular or substantially perpendicular to the first major surface of the substrate-type terminal.

21. An electronic component comprising:
a capacitor element including a stack of layers including a dielectric layer and an internal electrode stacked alternately in layers, a first external electrode provided at one longitudinally end portion of the stack of layers, and a second external electrode provided at the other longitudinally end portion of the stack of layers; and
a substrate-type terminal including a first major surface and a second major surface opposite to the first major surface, and including the capacitor element mounted on the first major surface; wherein
the substrate-type terminal includes on the first major surface a first mounting electrode electrically connected to the first external electrode of the capacitor element and a second mounting electrode electrically connected to the second external electrode of the capacitor element;
the substrate-type terminal includes on the second major surface a first connecting electrode provided for external connection and electrically connected to the first mounting electrode and a second connecting electrode provided for external connection and electrically connected to the second mounting electrode;
the substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface; and
the first and second slits are closed by a resist provided on one of the first major surface and the second major surface.

22. An electronic component comprising:
a capacitor element including a stack of layers including a dielectric layer and an internal electrode stacked alternately in layers, a first external electrode provided at one longitudinally end portion of the stack of layers, and a second external electrode provided at the other longitudinally end portion of the stack of layers; and
a substrate-type terminal including a first major surface and a second major surface opposite to the first major surface, and including the capacitor element mounted on the first major surface; wherein
the substrate-type terminal includes on the first major surface a first mounting electrode electrically connected to the first external electrode of the capacitor element and a second mounting electrode electrically connected to the second external electrode of the capacitor element;
the substrate-type terminal includes on the second major surface a first connecting electrode provided for external connection and electrically connected to the first mounting electrode and a second connecting electrode provided for external connection and electrically connected to the second mounting electrode;
the substrate-type terminal includes a first slit located between the first mounting electrode and the first connecting electrode, as seen in a plane, and penetrating the terminal from the first major surface to the second major surface, and a second slit located between the second mounting electrode and the second connecting electrode, as seen in a plane, and penetrating the terminal from the first major surface to the second major surface;
the capacitor element is mounted with the dielectric layer and the internal electrode stacked in layers in a direction parallel or substantially parallel to the first major surface of the substrate-type terminal;
the substrate-type terminal includes two of the first slits spaced from and opposite to each other and two of the second slits spaced from and opposite to each other;
the first connecting electrode is located between the first slits, as seen in a plane;
the second connecting electrode is located between the second slits, as seen in a plane;
the substrate-type terminal, as seen in a plane, includes an edge with a notch; and
the first and second slits each include one end extending to the notch and open, as seen in a plane.

23. A substrate-type terminal configured to have mounted thereon a capacitor element including a stack of layers including a dielectric layer and an internal electrode stacked alternately in layers, a first external electrode provided at one longitudinally end portion of the stack of layers, and a second external electrode provided at the other longitudinally end portion of the stack of layers, the substrate-type terminal comprising:
a first major surface to mount the capacitor element thereon;
a second major surface opposite to the first major surface;
a first mounting electrode located on the first major surface and electrically connected to the first external electrode of the capacitor element;
a second mounting electrode located on the first major surface and electrically connected to the second external electrode of the capacitor element;
a first connecting electrode located on the second major surface, provided for external connection and electrically connected to the first mounting electrode;
a second connecting electrode located on the second major surface, provided for external connection and electrically connected to the second mounting electrode;
a first slit located between the first mounting electrode and the first connecting electrode, as seen in a plane, and penetrating the terminal from the first major surface to the second major surface; and
a second slit located between the second mounting electrode and the second connecting electrode, as seen in a plane, and penetrating the terminal from the first major surface to the second major surface; wherein
the first and second slits are closed by a resist provided on one of the first major surface and the second major surface.

24. A substrate-type terminal configured to have mounted thereon a capacitor element including a stack of layers including a dielectric layer and an internal electrode stacked alternately in layers, a first external electrode provided at one longitudinally end portion of the stack of layers, and a second external electrode provided at the other longitudinally end portion of the stack of layers, the substrate-type terminal comprising:
- a first major surface to mount the capacitor element thereon;
- a second major surface opposite to the first major surface;
- a first mounting electrode located on the first major surface and electrically connected to the first external electrode of the capacitor element;
- a second mounting electrode located on the first major surface and electrically connected to the second external electrode of the capacitor element;
- a first connecting electrode located on the second major surface, provided for external connection and electrically connected to the first mounting electrode;
- a second connecting electrode located on the second major surface, provided for external connection and electrically connected to the second mounting electrode;
- a first slit located between the first mounting electrode and the first connecting electrode, as seen in a plane, and penetrating the terminal from the first major surface to the second major surface; and
- a second slit located between the second mounting electrode and the second connecting electrode, as seen in a plane, and penetrating the terminal from the first major surface to the second major surface; wherein the substrate-type terminal is configured such that capacitor element is mounted with the dielectric layer and the internal electrode stacked in layers in a direction parallel or substantially parallel to the first major surface of the substrate-type terminal;

two of the first slits are spaced from and opposite to each other and two of the second slits are spaced from and opposite to each other;

the first connecting electrode is located between the two first slits, as seen in a plane;

the second connecting electrode is located between the two second slits, as seen in a plane;

a notch is provided in an edge of the substrate-type terminal, as seen in a plane; and the first and second slits each include one end extending to the notch and open, as seen in a plane.

* * * * *